(12) United States Patent
Emerstorfer et al.

(10) Patent No.: US 11,827,847 B2
(45) Date of Patent: Nov. 28, 2023

(54) PROCESS FLUID WITH ENVIRONMENTALLY FRIENDLY BIOSTABILISATOR

(71) Applicant: AGRANA BETEILIGUNGS-AKTIENGESELLSCHAFT, Vienna (AT)

(72) Inventors: Florian Emerstorfer, Vienna (AT); Markus Omann, Vienna (AT); Johann Marihart, Limberg (AT); Marnik Michel Wastyn, Schwechat (AT)

(73) Assignee: AGRANA BETEILIGUNGS-AKTIENGESELLSCHAFT, Vienna (AT)

( * ) Notice: Subject to any disclaimer, the term of this patent is extended or adjusted under 35 U.S.C. 154(b) by 0 days.

(21) Appl. No.: 17/931,041

(22) Filed: Sep. 9, 2022

(65) Prior Publication Data

US 2023/0083037 A1 Mar. 16, 2023

Related U.S. Application Data

(63) Continuation of application No. 15/538,979, filed as application No. PCT/EP2015/081135 on Dec. 23, 2015.

(30) Foreign Application Priority Data

Dec. 23, 2014 (EP) .................................. 14199961

(51) Int. Cl.
*C09K 8/68* (2006.01)
*C09K 8/035* (2006.01)
(Continued)

(52) U.S. Cl.
CPC ................ *C09K 8/68* (2013.01); *A01N 37/02* (2013.01); *A01N 65/00* (2013.01); *A01N 65/06* (2013.01);
(Continued)

(58) Field of Classification Search
None
See application file for complete search history.

(56) References Cited

U.S. PATENT DOCUMENTS

| 3,960,736 A | 6/1976 | Free et al. |
| 4,169,798 A | 10/1979 | DeMartino |
(Continued)

FOREIGN PATENT DOCUMENTS

| EP | 1496096 A2 | 1/2005 |
| EP | 2175004 A1 | 4/2010 |
(Continued)

OTHER PUBLICATIONS

Supporting information, Temporal Changes in Microbial Ecology and Geochemistry in Produced Water from Hydraulically Fractured Marcellus Shale Gas Wells, Cluff et al., Environmental Science &Techonology, 2014, 48, p. 6508-6517 (Year: 2014).*
(Continued)

*Primary Examiner* — Aiqun Li
(74) *Attorney, Agent, or Firm* — McCoy Russell LLP

(57) ABSTRACT

Provided is a method for hydraulic fracturing in a borehole in a geological formation using a process fluid including an environmentally friendly biostabiliser. The biostabiliser is characterised in that it includes at least one organic acid, or a salt, alcohol or aldehyde thereof, such that the at least one organic acid is selected from the hop acids, resin acids, fatty acids and mixtures thereof.

12 Claims, 19 Drawing Sheets

(51) Int. Cl.

| | | |
|---|---|---|
| *A01N 37/02* | (2006.01) | |
| *A01N 65/00* | (2009.01) | |
| *C09K 8/60* | (2006.01) | |
| *C09K 8/90* | (2006.01) | |
| *C09K 8/20* | (2006.01) | |
| *C09K 8/80* | (2006.01) | |
| *E21B 43/26* | (2006.01) | |
| *E21B 43/267* | (2006.01) | |
| *A01N 65/06* | (2009.01) | |
| *A01N 65/08* | (2009.01) | |

(52) U.S. Cl.
CPC .............. *A01N 65/08* (2013.01); *C09K 8/035* (2013.01); *C09K 8/206* (2013.01); *C09K 8/605* (2013.01); *C09K 8/80* (2013.01); *C09K 8/90* (2013.01); *E21B 43/26* (2013.01); *E21B 43/267* (2013.01)

(56) References Cited

U.S. PATENT DOCUMENTS

| | | | |
|---|---|---|---|
| 4,659,811 | A | 4/1987 | Wu |
| 4,964,604 | A | 10/1990 | Lombard |
| 5,330,005 | A | 7/1994 | Card et al. |
| 5,681,796 | A | 10/1997 | Nimerick |
| 5,807,812 | A | 9/1998 | Smith et al. |
| 5,833,000 | A | 11/1998 | Weaver et al. |
| 6,039,966 | A | 3/2000 | Kostka et al. |
| 6,379,720 | B1 * | 4/2002 | Cooper .................. A01N 65/08 424/94.1 |
| 6,488,091 | B1 | 12/2002 | Weaver et al. |
| 6,810,959 | B1 | 11/2004 | Qu et al. |
| 6,849,581 | B1 | 2/2005 | Thompson et al. |
| 7,147,067 | B2 | 12/2006 | Getzlaf et al. |
| 7,825,073 | B2 | 11/2010 | Welton et al. |
| 7,913,762 | B2 | 3/2011 | Wheeler et al. |
| 8,739,878 | B2 | 6/2014 | Brannon et al. |
| 2003/0015480 | A1 | 1/2003 | Breen et al. |
| 2005/0145565 | A1 | 7/2005 | Painter et al. |
| 2005/0277572 | A1 | 12/2005 | Heise et al. |
| 2008/0032903 | A1 | 2/2008 | Starkey et al. |
| 2008/0058229 | A1 | 3/2008 | Berkland et al. |
| 2008/0161210 | A1 | 7/2008 | Welton et al. |
| 2013/0029884 | A1 | 1/2013 | Malchesky et al. |
| 2013/0196884 | A1 | 8/2013 | Kakadjian et al. |

FOREIGN PATENT DOCUMENTS

| | | | |
|---|---|---|---|
| WO | 9119771 | A1 | 12/1991 |
| WO | 0053814 | A1 | 9/2000 |
| WO | 0188205 | A1 | 11/2001 |
| WO | 2004081236 | A1 | 9/2004 |
| WO | 2006109225 | A1 | 10/2006 |
| WO | 2008067578 | A1 | 6/2008 |
| WO | 2010138420 | A2 | 12/2010 |
| WO | 2012012158 | A2 | 1/2012 |
| WO | 2012045711 | A1 | 4/2012 |
| WO | 2012123338 | A1 | 9/2012 |
| WO | 2012125890 | A2 | 9/2012 |
| WO | 2012135427 | A1 | 10/2012 |
| WO | 2012149560 | A2 | 11/2012 |
| WO | 2013123104 | A1 | 8/2013 |
| WO | 2014028105 | A1 | 2/2014 |
| WO | 2014085697 | A1 | 6/2014 |
| WO | 2014165813 | A1 | 10/2014 |
| WO | 2014200671 | A2 | 12/2014 |

OTHER PUBLICATIONS

"Resins, Natural," Chapter from "Ullmann's Encyclopedia of Industrial Chemistry, vol. A23: Refractory Ceramics to Silicon Carbide," Editors: Barbara Elvers et al., Available as Early as Jan. 1, 1993, 18 pages.

Ravot, G. et al., "*Haloanaerobium congolense* sp. nov., an anaerobic, moderately halophilic, thiosulfate- and sulfur-reducing bacterium from an African oil field," FEMS Microbiology Letters, vol. 147, No. 1, Feb. 1, 1997, 8 pages.

White, D. et al., "Antimicrobial resistance: standardisation and harmonisation of laboratory methodologies for the detection and quantification of antimicrobial resistance," Revue Scientifique Et Technique (International Office of Epizootics), vol. 20, No. 3, Dec. 2001, 10 pages.

Madigan, M. et al., "Brock Biology of Microorganisms, p. 138," 10th Edition, Available as Early as Jan. 1, 2003, 3 pages.

"Map of water hardness in the United States—Concentration of Hardness as Calcium Carbonate, in Milligrams Per Liter," United States Global Survey Website, Available Online at https://www.usgs.gov/media/images/map-water-hardness-united-states, 2005, 1 page.

Emerstorfer, F. et al., "The role of plant-based antimicrobials in food and feed production with special regard to silage fermentation," Die Bodenkultur, vol. 60, No. 3, Available as Early as Jan. 1, 2009, 11 pages.

Jorgensen, J. et al. "Antimicrobial Susceptibility Testing: A Review of General Principles and Contemporary Practices," Clinical Infectious Diseases, vol. 49, No. 11, Dec. 1, 2009, Available Online Oct. 26, 2009, 7 pages.

Struchtemeyer, C. et al., "Bacterial communities associated with hydraulic fracturing fluids in thermogenic natural gas wells in North Central Texas, USA," FEMS Microbiology Ecology, vol. 81, No. 1, Jul. 2012, Available Online Nov. 1, 2011, 13 pages.

Wang, J. et al., "Robust antimicrobial compounds and polymers derived from natural resin acids," Chemical Communications, vol. 48, No. 6, Jan. 21, 2012, Available Online Nov. 17, 2011, 3 pages.

Struchtemeyer, C. et al., "A critical assessment of the efficacy of biocides used during the hydraulic fracturing process in shale natural gas wells," International Biodeterioration & Biodegradation, vol. 71, Jul. 2012, Available Online Apr. 26, 2012, 7 pages.

Ashraf, M. et al., "Green biocides, a promising technology: current and future applications to industry and industrial processes," Journal of the Science of Food and Agriculture, vol. 94, No. 3, Feb. 2014, Available Online Aug. 23, 2013, 16 pages.

Mohan, A. et al., "Microbial Community Changes in Hydraulic Fracturing Fluids and Produced Water from Shale Gas Extraction," Environmental Science & Technology, vol. 47, No. 22, Nov. 19, 2013, Available Online Oct. 2, 2013, 10 pages.

Cluff, M. et al., "Temporal Changes in Microbial Ecology and Geochemistry in Produced Water from Hydraulically Fractured Marcellus Shale Gas Wells," Environmental Science & Technology, vol. 48, No. 11, Jun. 3, 2014, Available Online May 6, 2014, 10 pages.

Mohan, A. et al., "The Functional Potential of Microbial Communities in Hydraulic Fracturing Source Water and Produced Water from Natural Gas Extraction Characterized by Metagenomic Sequencing," PLOS One, vol. 9, No. 10, Oct. 22, 2014, 12 pages.

ISA European Patent Office, International Search Report Issued in Application No. PCT/EP2015/081135, dated Mar. 9, 2016, WIPO, 6 pages.

International Bureau of WIPO, International Preliminary Report on Patentability Issued in Application No. PCT/EP2015/081135, dated Jun. 29, 2017, WIPO, 8 pages.

\* cited by examiner

PROCESS FLUID WITH ENVIRONMENTALLY FRIENDLY BIOSTABILISATOR

CROSS-REFERENCE TO RELATED APPLICATIONS

The present application is a continuation of U.S. Non-Provisional patent application Ser. No. 15/538,979, entitled "PROCESS FLUID WITH ENVIRONMENTALLY FRIENDLY BIOSTABILISATOR," and filed on Jun. 22, 2017. U.S. Non-Provisional patent application Ser. No. 15/538,979 is a U.S. National Phase of International Patent Application Serial No. PCT/EP2015/081135, entitled "PROCESS FLUID WITH ENVIRONMENTALLY FRIENDLY BIOSTABILISATOR," filed on Dec. 23, 2015. International Patent Application Serial No. PCT/EP2015/081135 claims priority to European Patent Application No. 14199961.5, filed on Dec. 23, 2014. The entire contents of each of the above-listed applications are hereby incorporated by reference for all purposes.

TECHNICAL FIELD

The disclosure relates to a process fluid comprising an environmentally friendly biostabiliser for industrial scale use in the Earth's crust, preferably for use in oil and natural gas extraction, in particular in hydraulic fracturing.

BACKGROUND AND SUMMARY

The interior of the earth's crust has been colonised or is colonisable by numerous species of microorganisms, both in the ground and in the underlying geological formations. Due to their growth and metabolism, many of these microorganisms may complicate or even make impossible large scale processes in the Earth's crust, in particular in drilling for and extraction of water, crude oil, natural gas, for example; i.e. these are "undesirable microorganisms." Undesirable microorganisms may, for example, promote corrosion of conducting tubes and of other equipment made of metal by their metabolic products and may clog pipes by forming a slime (i.e. formation of extracellular polymeric substances) or by their growth ("biofilms"). This is also known as "biofouling." In addition, undesirable microorganisms may accumulate in a process fluid without a biostabiliser and may endanger ecological systems and human beings if this process fluid should leak out of a controlled setting into the environment.

On these and other grounds, biocides or biostabilisers (also referred to as biostats or biostatic agents) are frequently employed against undesirable microorganisms.

Biocides or biostabilisers have in particular been employed in the extraction of fossil fuels such as crude oil and natural gas as undesirable microorganisms may for example contaminate the fuel to be extracted by their metabolic products (e.g. sulphides) ("souring"). Undesirable microorganisms may diminish the yield of fossil fuels. In particular in hydraulic fracturing it is of importance to keep undesirable microorganisms under control. To this end, the following biocides have for example already been developed:

WO 2012/012158 A2 discloses biostat/biocide combinations, including a fully substituted butenolide as a biostat together with an isothiazolone as a biocide.

WO 2010/138420 A2 discloses two-component biocides including glutaraldehyde as one of the two components.

WO 2012/125890 A2 focuses on the controlled release of biocides.

WO 2014/165813 A1 deals with a method using biocides as a two-component system.

WO 2013/123104 A1 describes the use of an oxidising biocide.

Struchtemeyer et al. evaluate known biocides for their effectiveness against *Desulfovibrio desulfuricans* and a cultured isolate from the shale gas extraction.

US 2013/0029884 A1 discloses biocides mainly based on chloroxylenol which are to be effective even at high salt concentrations and high temperatures. A water-insoluble fatty acid, potassium ricinoleic acid, is disclosed as a preferred surfactant in a composition with the biocide (see, paragraph [0039], 1st sentence of the document). However, no biocidal or biostabilising effect is attributed to the fatty acid in the document, but in accordance with the disclosure it merely serves to improve the solubility of the biocide (see, paragraph [0040] of the document).

Usually, aggressive biocides such as glutaraldehyde are used in industrial scale processes in the Earth's crust, in particular in the crude oil and natural gas extraction, which are harmful to humans and the environment. This problem has been recognised, as described e.g. in Ashraf et al., Environmentally compatible biocides ("green biocides"), on a general term. In particular, the following publications disclose alternatives to traditional biocides for use in the oil and gas production:

WO 2014/085697 A1 discloses biocidal silver nanoparticles which can be pumped into the borehole.

WO 2012/135427 A1 describes a biocidal method on the basis of specific bacteriophages.

WO 2012/149560 A2 discloses chitosan as a biocide in the extraction of fossil fuels. Chitosan is described as being biocompatible.

However, such alternative biocides of the prior art have one or more disadvantages, such as: higher costs, lower efficiency, especially under the conditions which may prevail in the Earth's crust (e.g. higher temperatures), and for many, especially thermophilic microorganisms, complexity of application (for example with bacteriophages). In addition, these are for their most part still biocides and not biostabilisers and may have unclear effects on ecosystems. Furthermore, it is advantageous to have as many different and preferably environmentally compatible biocides or biostabilisers available as possible to collectively achieve a broad spectrum of activity against numerous species of undesired microorganisms. Thus, for example Cluff et al. describe that it is not possible with currently used biocides to bring all undesirable microorganisms under control (page 6514 lines 38-42 of the document). The issue of environmental compatibility is most notably of particular importance in Europe, and in fact even a prerequisite for establishing hydraulic fracturing in Europe. Developing a hydraulic fracturing process which is accepted by the public and the responsible authorities and which exclusively relies on employing environmentally compatible components—a so-called "biofracking" process—could promote energy self-sufficiency particularly of Europe; the present disclosure can to this purpose be of significant contribution. It is further believed that the effectiveness of the previously used biocides is reduced, among others, by the high salt concentrations which sometimes occur when, for example, a process fluid used in the Earth's crust detaches salt from this Earth's crust.

For these and other reasons, one object of the present disclosure is to provide a process fluid comprising an environmentally compatible biostabiliser for industrial scale use in the Earth's crust, preferably for use in oil and natural gas extraction, in particular in hydraulic fracturing, or in a geothermal bore (especially in deep geothermics, i.e. in more than 400 m depth) and a related production method and a corresponding method of use. In particular, this biostabiliser is effective against selected undesirable mesophilic or thermophilic microorganisms; especially those which are insufficiently prevented from growth or metabolism by the currently used biocides. Specifically, this biostabiliser should be effective in an environmental condition typical of the Earth's crust, especially of geological formations. Furthermore, this biostabiliser should be producible and employable as simply and economically as possible because this is required for its industrial scale use.

Accordingly, the present disclosure relates to a process fluid for—in particular industrial scale—use in the Earth's crust. The process fluid of the disclosure comprises a biostabiliser and is characterised in that the biostabiliser is comprised of at least one organic acid or a salt, alcohol or aldehyde thereof, wherein the at least one organic acid is selected from the group consisting of hop acids, resin acids, fatty acids and mixtures thereof.

Surprisingly, these organic acids have been found particularly suitable for biostabilisation in industrial scale use in the Earth's crust, preferably for use in oil and natural gas extraction, in particular in hydraulic fracturing, or in a geothermal bore.

Thus, these organic acids are also effective in particular at the higher temperatures which may prevail in geological formations at a depth of 1 km to 5 km, and even against selected unwanted mesophilic or thermophilic microorganisms which can occur or grow in this environment.

These organic acids may be added particularly simply and cost-effectively to obtain the process fluid of the disclosure—for example, hop acids may be added in the form of a hop extract and selected resin acids may be added in the form of a natural resin, especially rosin—preferably as an alkaline solution of selected resin acids in the form of a natural resin, especially rosin.

Said organic acids have already been proven to be biostabilising in food production, as described, inter alia, in the documents WO 00/053814 A1, WO 01/88205 A1, WO 2004/081236 A1 and WO 2008/067578 A1. The use in the Earth's crust or even industrial scale use in the Earth's crust is, however, not suggested in these documents. In food production, these organic acids have been found to be well tolerated by humans and the environment.

In Emerstorfer et al. the minimum inhibitory concentration of hop beta acids, resin acids and a mixture of resin acids and myristic acid was investigated against various bacteria, yeasts and molds and was compared to the effect of potassium hydroxide and hydrogen peroxide. The use in the Earth's crust or even industrial scale use in the Earth's crust is, however, not suggested in this document.

Although Wang et al. refers to resin acid derivatives as antimicrobial agents, their use in the Earth's crust or even their industrial scale use in the Earth's crust, especially in the difficult conditions typical of the oil and natural gas extraction, in particular in hydraulic fracturing, or, for example in deep geothermics, is also not suggested in this document.

EP 1 496 096 A2 refers to additives for oil-based drill flushing fluids. It is disclosed that this additive contains two main components (page 2, line 38 of the document). The first principal component is a polyamide with a terminal carboxylic acid residue (page 2, lines 38-39 of the document). The second major component is a mixture obtainable from the Diels-Alder reaction of a dienophile with a mixture of fatty acids and resin acids (page 2, lines 39-41 of the document). The maximally preferred dienophile is maleic acid anhydride (page 2, line 55 of the document). The document, however, shows that the fatty acids and resin acids are only a starting material for a chemical reaction and that the drill flushing fluid comprising an additive does not contain fatty acids and resin acids. In paragraphs [0048] and [0049] of the document it is thus referred to as "modified fatty acid/resin acid component." Therefore, the present disclosure is neither anticipated nor suggested by EP 1 496 096 A2.

The subject of US 2003/0015480 A1 is a method using hop acid to control (the growth) of (micro)organisms. The method is disclosed as being useful for the treatment of any "aqueous system" (paragraph [0064] of the document). The "aqueous system" is defined as an "aqueous system" in which the water of the system is not in contact with the final product (paragraph [0065] of the document). The document does, however, not disclose that the use of hop acid in the Earth's crust is provided. The document does not anticipate the present disclosure nor does it suggest it.

WO 2014/200671 A2 relates to clay inhibitors for drilling and fracturing. Disclosed in WO 2014/020671 is a clay inhibitor composition which is produced by reacting a maleated "fatty acid material" from rosin or soybean oil with an "ethylene amine material." The fatty acid material is chemically reacted according to the disclosure of the document even in two steps (maleation and reaction with ethylene amines. See Example 1 of the document), before it is used. Thus, the present disclosure is neither anticipated nor suggested by WO 2014/200671 A2.

WO 91/19771 relates to flowable borehole treating agents based on polycarboxylic acid esters (and not polycarboxylic acids). Also by this document, the present disclosure is neither anticipated nor suggested.

The mentioned industrial scale use requires the use of large amounts (volumes) of the process fluid of the disclosure. Preferably, the process fluid of the disclosure is thus produced in an amount of at least $10^4$ L, preferably at least $10^5$ L, specifically at least $10^6$ L. In hydraulic fracturing, for example, from $10^7$ to $10^8$ liter of the process fluid of the present disclosure are usually injected through the borehole into the Earth's crust.

The crust is the outermost solid shell of the earth and may extend to a depth of approximately 100 km, on average approximately to a depth of 35 km. The top layer of the Earth's crust usually forms what is commonly referred to as the ground, with a usual depth of about 10 m-20 m. Below lies a wide variety of geological formations with different widths. Generally, the temperature of the Earth's crust increases with every kilometer depth by about 25° C.-30° C., with considerable local deviations.

For example, the fuel deposits that are to be extracted by hydraulic fracturing are often at a depth of 1-3 km, so that the temperature there may usually be 25°-90° C.; thus, depending on local conditions, mesophilic, thermophilic and/or hyperthermophilic microorganisms are playing a role in hydraulic fracturing (and in the oil and natural gas extraction, in (deep) geothermics or industrial scale processes in the Earth's crust in general). Cluff et al. state temperatures for one kilometer of depth of more than 50° C., a pore pressure of more than 30 MPa and pH values of less than 6 as expected possible environmental conditions (page 6509 lines 16-18 of the document). Here, too, and also depending on local conditions, halophilic or halo-tolerant microorganisms are playing a role in hydraulic fracturing (and in the oil and natural gas extraction, in (deep) geothermics or industrial scale processes in the Earth's crust in general).

In addition to those microorganisms resident in their respective depths, the growth of microorganisms has to be combatted for special industrial applications, too, which were, for example, introduced through the bore or the pumping of the process fluid itself into the respective depth.

In the following, the undesired microorganisms, mainly in oil and natural gas extraction, in particular in hydraulic fracturing, or in deep geothermics, will be described: the undesirable microorganisms are selected from the group of bacteria, fungi and archaea, preferably they are selected from the group of bacteria. Particularly undesirable are microorganisms (in front of all bacteria) which produce one or more of the following: acid, extracellular polymeric substances (e.g. in biofilms), and sulphides. Particularly undesirable are sulphide producers, among others because of the resulting odor, health concerns, the corrosion caused by the resulting sulphides, and the contamination of the pumping fossil fuel ("souring").

For the present disclosure, those microorganisms are also target objects (i.e. are undesirable microorganisms in the meaning of the disclosure) which metabolise—in particular in enhanced growth or metabolic activity—the products to be extracted, especially crude oil and natural gas, and thus may significantly reduce the yield of the extraction.

In some aspects, the undesired microorganisms are bacteria. They may belong to the phylum of Firmicutes, Bacteroidetes, Actinobacteria or Proteobacteria, especially to the phylum of Firmicutes. They may also belong to one of the following genera: *Pseudomonas, Cobetia, Shewanella, Thermoanaerobacter, Arcobacter, Pseudoalteromonas, Marinobacterium, Halolactibacillus* (also known as *Halolactobacillus*), *Selenihalanaerobacter, Vibrio, Desulfovibrio, Burkholderia, Arcobacter, Dietzia, Microbacterium, Idiomarina, Marinobacter, Halomonas* and *Halanaerobium*, more preferably to a genus selected from *Halolactibacillus* and *Halanaerobium*.

Out of the archaea, particularly undesired are the genera *Methanosarcinales, Methanohalophilus* and *Methanolobus*.

Furthermore, comprised among the undesired microorganisms are those listed in Cluff et al., Mohan et al., 2013, Mohan et al., 2014, Struchtemeyer et al., 2012b, or in another document cited herein, which are mentioned mutatis mutandis as undesirable.

It has been found as part of the disclosure that the process fluid with the inventive biostabiliser is effective against many of these undesired microorganisms, preferably against many of the firmicutes, especially against sulphide producing firmicutes. It was particularly surprising that the inventive process fluid with the biostabiliser was effective against bacteria selected from the genera *Halolactibacillus* and *Halanaerobium*.

The inventive process fluid is particularly effective against members of *Halolactibacillus*. Cluff et al. report for example that the *Halolactibacillus*-load increases during the first two weeks of the flowback phase in hydraulic fracturing, and even, although aggressive biocides are contained—as is usual with hydraulic fracturing in the USA (page 6514 right column, lines 15-16 of the 2nd paragraph of the document). In 2 out of 3 drills, the *Halolactibacillus*-load temporarily even rises to more than 90% (see FIG. 2 of the document, "Initial Flowback Period"— "Well 1", "Well 2") of the analyzed DNA sequences. Thus, it can be assumed that conventional environmentally harzardous biocides—unlike the biostabiliser according to the disclosure—are insufficiently effective against *Halolactibacillus*.

The genus *Halolactibacillus* includes, for example, *H. halophilus* and *H. miurensis*. The biostabiliser according to the present disclosure is particularly effective against both of these types. According to Cluff et al. *Halolactibacillus* (and other fermentative firmicutes) are important temporary members of the bacterial flora ("transitional community members"), which, by means of their metabolic products, constitute the source of life for future (unwanted) microorganisms (page 6512, right column, last paragraph of the document). Also for this reason, the effectiveness of the process fluid of the disclosure against *Halolactibacillus* is particularly important in aspects of the present disclosure.

The biocides used hitherto are insufficient especially against *Halanaerobium*, as reported for example by Cluff I. Thus, *Halanaerobium* dominates the microbial flora in later stages of hydraulic fracturing (see FIG. 2 of the document, columns under the title "Later Produced Water"). The genus *Halanaerobium* includes for example *Halanaerobium congolense*, which grow well for example at a mass concentration of 10% NaCl and 45° C. under anaerobic conditions (i.e. for example in a shale gas reservoir) and which can reduce thiosulphate or sulphur compounds to sulphides by oxidising carbohydrates (i.e. for example the pumped fuel) which is not desirable in the oil and natural gas extraction. Also *Halanaerobium praevalens* is particularly undesirable.

Said organic acids or constituents which contain said organic acids are known per se from, inter alia, the documents WO 00/053814 A1, WO 01/88205 A1, WO 2004/081236 A1 and WO 2008/067578 A1. All production processes or preparation methods described in these documents, especially for hop extract, natural resin or myristic acid, or a salt thereof, are preferred according to the present disclosure.

Hop acids are ingredients of unfertilised blossoms of female hop plants. These bitter-tasting hop ingredients have been used for the production of storable beer for centuries and have, thus, even found their way into human nutrition. The environmental compatibility, especially at the final concentrations proposed herein, is thus given.

The hop plant *Humulus lupulus* belongs to the botanical family of Cannabaceae; hop is cultivated in many countries and used for the production of beer. Unfertilised female hop plants form the so-called hop cones which are holding the hop resin. Hop resin, in turn, contains the most varying kinds of biostabilising substances. The hop ingredients can be extracted using ethanol or supercritical $CO_2$.

The bitter constituents recoverable from the hop resin include various fractions such as humulone (alpha acid) and lupulone (beta acid). These substances have microbiological inhibitory activity and can be converted into their isoforms by heating, whereby better water solubility is given at a still existing inhibitory effect on undesired microorganisms. To increase the solubility and prevent precipitation at storage, it is sometimes favorable to add myristic acid in small amounts as a technical excipient already in the preparation process.

Examples of suitable hop acids can be found in US 2003/015480 and WO 00/053814 A1.

Even many fatty acid compounds are physiologically harmless natural products. The environmental compatibility particularly in the final concentrations suggested herein is thus given. The fatty acid compounds according to the present disclosure may also be fatty acid alcohols or fatty acid aldehydes. The fatty acid compounds may also be modified such as by the incorporation of functional groups such as —OH, —SH, —NH$_2$, —F, —Cl, —Br, —I, and the like (except derivatives which are toxic to humans, animals or plants); aliphatic side chains and/or one or more (especially two or three) (unsaturated) double bonds are possible as well, as long as the physico-chemical properties of the (aliphatic) backbone, in particular the solubility in biostabilising concentrations as well as the structure of the C1 atom are preserved. The biostabilising effect of fatty acids is known for example from WO 2004/081236 A1. In general, experiments have shown that in general the free fatty acids and their soaps according to the present disclosure have better antimicrobial efficacy than their aldehydes or esters. In particular myristic acid or its soap has proven particularly useful in the disclosure, especially with respect to its antimicrobial activity.

Tree resins from pine, for example, and the rosin obtained therefrom by distillation which consists mostly of resin acids, have bactericide properties which have been used for human consumption for centuries. The environmental compatibility, especially at the final concentrations proposed herein, is thus given.

Preferably, the resin acids or the resin are obtained from pines. Pines, such as the austrian black pine *Pinus nigra Austriaca*, belong to the botanical family of *Pinaceae*; they are primarily widespread in the Northern hemisphere and the resins therefrom have a long tradition in the production of Retsina, a Greek resinated wine. To obtain the biostabilisingly active ingredients the pine resin is preferably separated by distillation into the two fractions turpentine and rosin. Rosin now consists of the active ingredients which are a mixture of resin acids. These can be dissolved with alkalis to alkaline resinates.

Rosin is a mixture of aromatic compounds such as abietic acid, dehydroabietic acid and isomers thereof. These so-called resin acids, which are commercially available in the form of solid rosin blocks, have a biostabilising activity of varying degrees and can be used as water soluble alkali resinates. To increase the solubility and prevent precipitation of the resin soap at storage it is favorable to add myristic acid in small amounts as a technical exzipient already in its preparation process.

According to the disclosure, all food-compatible resins, such as described for example in "Ullmann's Encyclopedia of Industrial Chemistry", Vol. A 23 (1993) pages 73-88, can be used, such as wood resins, more particular balms, such as benzoin, pine balm, myrrh and tolu balm. For reasons of economy and in accordance with the disclosure, mainly rosin products and their derivatives are preferred. Products like this are described for example in Ullmann's Encyclopedia of Industrial Chemistry, Vol. A 23 (1993) pages 79-88.

Partly because of the above-described surprising biostabilising effect in terms of selected mesophilic, thermophilic, hyperthermophilic, halo-tolerant and/or halophilic bacteria, in particular of the phylus Firmicutes, is the process fluid of the present disclosure in a preferred embodiment for use in oil and natural gas extraction, in particular in hydraulic fracturing, and characterised in that the process fluid further comprises a proppant ("propping agent"), and preferably comprises at least one substance which is selected from the group consisting of gelling agents, clay stabilisers ("clay stabilising agents"), friction modifiers ("friction reducers" or "friction reducing agents"), chain breakers ("breaking agents"), crosslinkers ("crosslinking agents") and buffering agents. Such a process fluid can also be called an "oilfield fluid" or "drilling fluid".

Hydraulic fracturing is well known to one of skill in the art. Among others, the following documents (in addition to the initially cited) describe aspects of hydraulic fracturing: U.S. Pat. No. 7,913,762, EP 2175004 A1, US 2013/0196884 A1, WO 2014/028105 A1, U.S. Pat. Nos. 6,488,091, 7,147,067, 7,825,073, 5,330,005, 5,833,000, 4,169,798, 8,739,878, 3,960,736, 6,810,959, WO 2012/045711 A1, WO 2012/123338 A1.

It is also known to one skilled in the art (among others, directly from the documents mentioned in the paragraph above), which components in the inventive process fluid for use in oil and natural gas extraction, in particular in hydraulic fracturing, are to be included in what amounts. This is, inter alia, dependent on the nature of each respective oil and natural gas reservoir. Preferably are included as a proppant one or more of the following components selected from: quartz sand, processed bauxite and any kind of ceramic beads. If a gelling agent (or thickener) is included, one or more of the following components are preferably included as a gelling agent selected from: biopolymers or polymeric derivatives thereof, preferably polysaccharides, preferably starches and modified starches, vegetable gums or pectins, especially starches and modified starches. If a clay stabiliser is included, one or more of the following components are preferably included as a clay stabiliser selected from: potassium salts, such as potassium chloride, sodium chloride, and ammonium salts such as ammonium chloride and tetramethylammonium chloride. If a friction modifier is included, one or more of the following components are preferably included as a friction modifier selected from: latex polymers, polyacrylamide and hydrogenated light petroleum distillates. If a crosslinker is included, one or more of the following components are preferably included as a crosslinker selected from: triethanolamine, sodium tetraborate, citrus terpenes, zirconium dichloride oxide, borates, and organic zirconium complexes. If a buffering agent is included, one or more of the following components are preferably included as a buffering agent selected from: acetic acid, fumaric acid, potassium carbonate, borax, sodium acetate, sodium bicarbonate, sodium carbonate, and sodium hydroxide. Preferably, water is also included. In particular, the inventive process fluid is provided on a water basis, i.e. water is present in relation to the total mass of the main components of the process fluid and is used for example as a solvent or medium.

In addition to the aforementioned components in the inventive process fluid for use in oil and natural gas extraction, in particular in hydraulic fracturing, further components may be included, among others selected from ingredients named in one of the documents U.S. Pat. No. 7,913,762, EP 2175004 A1, US 2013/0196884 A1, WO 2014/028105 A1, U.S. Pat. Nos. 6,488,091, 7,147,067, 7,825,073, 5,330,005, 5,833,000, 4,169,798, 8,739,878, 3,960,736, 6,810,959, WO 2012/045711 A1, WO 2012/123338 A1, or any other component which the skilled artisan might deem expedient for use in oil and natural gas extraction, in particular in hydraulic fracturing. In addition or instead, still any other components may be provided in the inventive process fluid for use in oil and natural gas extraction, in particular in hydraulic fracturing, provided a proppant is contained.

Summarised and simplified, hydraulic fracturing following drilling usually comprises the following three sections:
1. Injection of the process fluid ("fracturing fluid" or "fracfluid") under high pressure into the borehole, whereby cracks in the fuel containing sediment far below are caused;

2. Flowback of the process fluid in which about 10%-70% of the process fluid crop out again with a usual duration of two weeks and after the reflux has subsided;
3. Production phase, in which the remaining portion of the process fluid, including mixed with formation water and the pumped fuels, is pumped up as so-called production water ("produced water"). Preferably, the process fluid with the biostabiliser according to the present disclosure is effective during this phase (or against microorganisms which occur frequently during this phase) to counteract unwanted changes to the pumped fuels or on the infrastructure used in the borehole. Customarily, this phase takes the longest of the three mentioned phases, so that the risk of microbially induced damage is highest. According to Cliff et al., *Halanaerobium* may dominate in the produced water, especially with progressive duration of the production phase (see FIG. 2 of the document). Therefore, a biostabilisation with respect to *Halanaerobium* is particularly indicated.

In the course of the present disclosure it has been shown that the inventive process fluid for use in oil and natural gas extraction or in a geothermal drilling acts particularly well biostabilising with respect to the unwanted microorganisms mentioned herein, when biopolymers such as polysaccharides, especially starch and modified starches, are included as a gelling agent. These biopolymers are very vulnerable to microbial decomposition for example in the borehole. On the other hand, an (intentional) decomposition of the components added to the process fluid such as the biopolymers and/or the inventive biostabilisers may be desirable after a certain time. Both can be realised with the present disclosure, because the degradation of these substances—due to its harmlessness in principle and its fundamentally safe biodegradability—can be controlled to a certain extent.

Therefore, the process fluid for use in oil and natural gas extraction or in a geothermal drilling is characterised in a preferred embodiment in that it further contains at least one gelling agent, wherein the gelling agent is a biopolymer or a polymeric derivative thereof; preferably, wherein the biopolymer is a polysaccharide, preferably a starch, a vegetable gum such as xanthan, a cellulose, e.g. polyanionic cellulose, or a pectin, especially a starch. According to the disclosure, any derivatisation of the biopolymer deemed appropriate by one of skill in the art is, among other things, possible in this embodiment; however, the gelling properties of the biopolymer must essentially be retained or—with respect to degradability—must be adjustable or controllable. Preferred biopolymers or derivatives thereof are also disclosed in WO 2012/045711 A1, U.S. Pat. No. 4,659,811, WO 2006/109225, U.S. Pat. Nos. 5,681,796, 4,964,604, 4,169,798 or U.S. Pat. No. 6,810,959, or in selected ones of the above quoted documents.

In the process fluid of the disclosure for use in a geothermal drilling further components can be contained, among others components which are typical for a drilling fluid in geothermics or deep geothermics, or any other components which one of skill in the art might deem expedient for use in a geothermal bore. Preferably, one or more substances selected from the following groups are present: gelling agents, in particular those mentioned in the previous paragraph; buffering agents, in particular those selected from acetic acid, fumaric acid, potassium carbonate, borax, sodium acetate, sodium bicarbonate, sodium carbonate, sodium hydroxide; and clay minerals, in particular bentonite, in a finely granulated form (e.g. ground). Example 5A shows an inventive process fluid, which was successfully used as a drilling fluid in a geothermal bore.

Surprisingly it has been found that it is advantageous if a defoamer is contained in the inventive process fluid, in particular for use in a geothermal bore (see Example 5B). Preferably, this defoamer is based on non-ionic surfactants, for example on fatty alcohol alkoxylate or alkylene oxide polymer basis. A suitable product is for example BASOPUR® DF 5 of BASF SE). Preferably, the process fluid of the present disclosure comprises water.

Surprisingly it has been found in the course of the present disclosure that the process fluid of the disclosure, if water is contained or is added, acts biostabilising in regard to the undesirable microorganisms mentioned herein the better, the softer the water is or will be made. The inventive process fluid acts particularly well biostabilising when the water hardness is at most 20° dH (German Hardness) or 3.57 mmol/l (alkaline earth ions), preferably not more than 15° dH or 2.67 mmol/l, more preferably at most 10° dH or 1.78 mmol/l, even more preferred at most 7.5° dH or 1.34 mmol/l, in particular at most 5° dH or 0.89 mmol/l. By the inventive use of the process fluid in the Earth's crust, in particular in hydraulic fracturing, alkaline earth ions can be brought into solution, resulting in a higher water hardness.

Therefore, the process fluid of the present disclosure is in a preferred embodiment characterised in that it further comprises a water softener. All water softener which deem expedient to one skilled in the art are appropriate. Preferably, the water softener is a cation exchanger or a chelator, in particular selected from: zeolites (such as zeolite A), inorganic polyphosphates (such as triphosphate), ethylenediamine tetraacetic acid and salts thereof, nitrilotriacetic acid and salts thereof, polyacrylates, and citrate.

It has been found that the inventive process fluid acts particularly well biostabilising in regard to the undesirable microorganisms mentioned herein if a plurality of the named organic acids is contained therein. This results in a synergistic effect with respect to the biostabilising effect. Therefore, another preferred embodiment of the present disclosure relates to the inventive process fluid, further characterised in that the biostabiliser comprises a mixture, which is preferably selected from:

at least one hop acid, or a salt, alcohol or aldehyde thereof, and at least one fatty acid, or a salt, alcohol or aldehyde thereof, or at least one resin acid, or a salt, alcohol or aldehyde thereof, and at least one fatty acid, or a salt, alcohol or aldehyde thereof, or at least one hop acid, or a salt, alcohol or aldehyde thereof, and at least one resin acid, or a salt, alcohol or aldehyde thereof, and at least one fatty acid, or a salt, alcohol or aldehyde thereof;

in particular wherein the biostabiliser is a mixture of at least one hop acid, or a salt, alcohol or aldehyde thereof, and at least one resin acid, or a salt, alcohol or aldehyde thereof, and at least one fatty acid, or a salt, alcohol or aldehyde thereof.

In the course of the present disclosure, one biostabiliser has surprisingly proven particularly effective in regard of the undesired microorganisms mentioned herein, comprising at least one selected from hop extract, a natural resin (especially rosin) and myristic acid or a salt thereof. Consequently, the process fluid of the present disclosure is in a particularly preferred embodiment characterised in that the biostabiliser is a mixture of at least one, preferably at least two, in particular all of the following components: hop extract, natural resin, preferably rosin, wherein the natural resin is preferably added in dissolved form, and myristic acid or a salt thereof. Another particularly preferred embodiment relates to the process fluid according to the disclosure, which is further characterised in that the biostabiliser is obtainable by adding at least one, preferably at least two, in particular all of the following components: hop extract, natural resin, preferably rosin, wherein the natural resin is preferably added in dissolved form, and myristic acid or a salt thereof.

Preferably, the hop acid of the present disclosure consists of an alpha hop acid, selected from the group consisting of humulone, isohumulone, cohumulone, adhumulone, prehumulone, posthumulone, tetrahydroisohumulone, and tetrahydrodeoxyhumulone, or a beta hop acid, selected from the group consisting of lupulone, colupulone, adlupulone, prelupulone, postlupulone, hexahydrocolupulone, and hexahydrolupulone, because these are suitable for biostabilisation.

Preferably the resin acid of the present disclosure is selected from the group consisting of pimaric acid, neoabietic acid, abietic acid, dehydroabietic acid, levopimaric acid, and palustrinic acid, because these are suitable for biostabilisation.

Preferably the fatty acid of the present disclosure is selected from the group consisting of capric acid, undecylenic acid, lauric acid, myristic acid, palmitic acid, margaric acid, stearic acid, arachinic acid, behenic acid, lignoceric acid, cerotic acid, palmitoleinic acid, oleic acid, elaidic acid, vaccenic acid, icosenoic acid, cetoleic acid, erucic acid, nervonic acid, linoleic acid, linolenic acid, arachidonic acid, timnodonic acid, clupanodonic acid, and cervonic acid, because they are suitable for biostabilisation. Particularly preferred is myristic acid.

Investigations in the course of the present disclosure have come to concentration ranges for the biostabiliser's components which are particularly suitable for biostabilisation regarding undesirable microorganisms. Thus, another preferred embodiment of the present disclosure refers to an inventive process fluid which is characterised in that:
- the total concentration of hop acids in the process fluid is 0.01-1000 ppm, preferably 0.05-100 ppm, more preferably 0,1-10 ppm, particularly 0.5-5 ppm; and/or
- the total concentration of resin acids in the process fluid is 0.05-5000 ppm, preferably 0.25-500 ppm, more preferably 0.5-50 ppm, particularly 0.25-25 ppm; and/or
- the total concentration of fatty acids in the process fluid is 0.05-5000 ppm, preferably 0.25-500 ppm, more preferably 0.5-50 ppm, particularly 0.25-25 ppm.

Preferably, "ppm" ("parts per million") refers to the percentage of each organic acid(s) (in mg) of the total mass of the process fluid (in kg), i.e. ppm stands for mg/kg.

The stated concentrations are final biostabiliser concentrations, i.e. the process fluid can be pumped with the mentioned final concentrations of the biostabiliser into the Earth's crust and can there unfold its biostabilising effect, in addition to the technical result for each specific application. The process fluid is compatible with the environment in particular with these final concentrations.

In selected situations, it is necessary to enlarge the biostabilitory effective spectrum of the process fluid of the present disclosure or to provide additional biocide effects therewith. Therefore, the process fluid according to the disclosure is in a further preferred embodiment characterised in that it further comprises at least one other microbially active substance and/or biostabiliser, preferably selected from acetic acid, lactic acid, propionic acid, benzoic acid, sorbic acid, formic acid, and salts thereof; chitosan and chitosan derivatives, such as disclosed in WO 2012/149560 A2, are preferred, too.

In a further aspect of the present disclosure, the use of the process fluid according to the disclosure in the Earth's crust, preferably in oil and natural gas extraction, in particular in hydraulic fracturing, or in a geothermal bore, is disclosed. The process fluid can for example be used in pipes, tubes or (lined or unlined) wells etc. Preferable is the use of the process fluid according to the disclosure in the Earth's crust also with drillings of any kind. In a preferred embodiment, at least $10^4$ L, preferably at least $10^5$ L, in particular at least $10^6$ L of the process fluid according to the disclosure are used. Preferably, an undesirable microorganism is inhibited in its growth and/or metabolism by the biostabiliser of the process fluid, which is a bacteria, preferably selected from the phylus of Firmicutes, Actinobacteria, Bacteroidetes, or Proteobacteria, in particular of the phylus of Firmicutes. This undesirable microorganism further belongs to a genus of bacteria selected from *Pseudomonas, Cobetia, Shewanella, Thermoanaerobacter, Arcobacter, Pseudoalteromonas, Marinobacterium, Halolactibacillus, Selenihalanaerobacter, Vibrio, Desulfovibrio, Burkholderia, Arcobacter, Dietzia, Microbacterium, Idiomarina, Marinobacter, Halomonas* and *Halanaerobium*, more preferably to a genus selected from *Halolactibacillus* and *Halanaerobium*.

In a further preferred embodiment of the use of the process fluid, in particular in geothermal drilling, the process fluid according to the disclosure is used in a depth of 100 m-8000 m, preferably of 200 m-7000 m, more preferably of 300 m-6000 m, even more preferred of 400 m-5000 m, particularly of 500 m-4000 m or even of 600 m-3500 m.

The process fluid according to the disclosure is preferably employed for use as a drilling fluid in a geothermal borehole. Since the biostabiliser of the process fluid according to the disclosure is particularly compatible with the environment in the final concentrations mentioned herein, the process fluid of the present disclosure is also very suitable for an application, which includes the direct contact of the process fluid with the Earth's crust, because a higher risk of groundwater contamination exists in such an application. For example, the process fluid is in direct contact with the Earth's crust in hydraulic fracturing, especially in a shale gas deposit, and, due to the pumping at high pressure, could leak through cracks and instabilities in the formations into the overlying groundwater. Therefore, the use of the present disclosure preferably comprises the direct contact of the process fluid with the Earth's crust.

Another aspect of the present disclosure relates to a method for a biostabilisation in the Earth's crust, preferably in oil and natural gas extraction, in particular in hydraulic fracturing, or in geothermal drilling, comprising pumping the process fluid according to the disclosure into the Earth's crust, preferably comprising the direct contact of the process fluid with the Earth's crust. Among other things, for the reasons just mentioned, the process fluid according to the disclosure is particularly suitable for said direct contact. In a preferred embodiment at least $10^4$ L, preferably at least $10^5$ L, in particular at least $10^6$ L of the process fluid according to the disclosure are pumped into the Earth's crust.

Preferably, in the inventive process for biostabilisation, an unwanted microorganism is inhibited in its growth and/or metabolism by the biostabiliser of the process fluid, which is a bacteria, preferably selected from the phylus of Firmicutes, Actinobacteria, Bacteroidetes or Proteobacteria, in particular of the phylus of Firmicutes. This undesirable microorganism may further belongs to a genus of bacteria selected from *Pseudomonas, Cobetia, Shewanella, Thermoanaerobacter, Arcobacter, Pseudoalteromonas, Marinobacterium, Halolactibacillus, Selenihalanaerobacter, Vibrio, Desulfovibrio, Burkholderia, Arcobacter, Dietzia, Microbacterium, Idiomarina, Marinobacter, Halomonas* and *Halanaerobium*, more preferably to a genus selected from *Halolactibacillus* and *Halanaerobium*. In a further embodiment of the process for biostabilisation in the Earth's crust, in particular in geothermal drilling, the process fluid according to the disclosure is used in a depth of 100 m-8000 m, preferably of 200 m-7000 m, more preferred of 300 m-6000 m, even more preferred of 400 m-5000 m, particularly of 500 m-4000 m or even of 600 m-3500 m. In a geothermal borehole, the process fluid according to the disclosure is preferably used in this process as a drilling fluid.

In a further aspect of the present disclosure, a method for preparing the process fluid according to the disclosure is disclosed, wherein the process fluid includes water. The method comprises adding at least one organic acid or a salt, alcohol or aldehyde thereof, to water or a water-containing portion of the process fluid, wherein the at least one organic acid is selected from the group consisting of hop acids, resin acids, fatty acids, and mixtures of two or all of them. In a preferred embodiment at least $10^4$ L, preferably at least $10^5$ L, in particular at least $10^6$ L of the process fluid according to the disclosure are prepared.

If the process fluid according to the disclosure includes a resin acid, it is extremely economical to add it in the form of a resin or a distillate thereof, especially rosin. Consequently, the preparation method of the disclosure is, if at least one resin acid will be supplied, characterised in a preferred embodiment in that the at least one resin acid is added in the form of a resin, preferably of a natural resin, even more preferred in the form of rosin. In another embodiment it is favorable to employ in doing so a dissolved, emulsified or dispersed, or pasty, rosin product, preferably based on pine resin, pine balm, rosin acids, salts of rosin acids (resin soaps), non-denatured derivatives of pine resins (i.e. derivatives, obtained without the influence of strong acids or bases). As rosin derivatives, preferred according to the disclosure are also individual components of rosin which are either chemically synthesised or isolated from rosin products, such as levopimaric acid, neoabietic acid, palustrinic acid, abietic acid, dehydroabietic acid, tetrahydroabietic acid, dihydroabietic acid, pimaric acid, and isopimaric acid. Derivatisation of rosin may within the meaning of the disclosure further provide for hydrogenation, polymerisation, addition reactions, esterification, nitrilation, amination etc. In the embodiments described in this paragraph it is particularly preferred if the respective resin acid containing component (such as the resin or a distillate thereof) is added as an alcoholic solution or suspension, preferably as a 1 to 95%, especially as a 10 to 80% solution of ethanol, or as an alkaline solution, preferably a 0.5 to 35% alkaline solution (the at least one fatty acid may also be added in an alkaline solution as just described).

It may also be expedient in the preparation process according to the disclosure to add, if at least one resin acid and/or fatty acid is to be added, this at least one resin acid and/or fatty acid as a saline solution or suspension, preferably as a potassium salt solution, particularly as a 0.5 to 35% potassium salt solution.

For economic reasons, it is preferable to add, if at least one hop acid is to be added in the preparation process, this at least one hop acid in the form of a hop extract. The production of hop extract itself has been known for long, and usually the extraction from unfertilised blossoms of female hop plants is effected with alcohol, especially ethanol, as a solvent, or preferably by extraction with supercritical $CO_2$. Other preferred variants of the addition of hop extract are disclosed in WO 00/053814 A1.

In a further preferred embodiment of the present disclosure, the preparation process of the disclosure further comprises the addition of a further antimicrobial agent or of stabiliser to water or a water-containing portion of the process fluid, preferably selected from acetic acid, lactic acid, propionic acid, benzoic acid, sorbic acid, formic acid and salts thereof. The addition of chitosan and chitosan derivatives, such as disclosed in WO 2012/149560 A2, is also preferred.

In a particularly preferred embodiment of the present disclosure is the preparation method according to the disclosure for the preparation of a process fluid for use in oil and natural gas extraction, in particular in hydraulic fracturing. This method is characterised in that it further comprises adding a proppant and preferably at least one substance to water or a water containing portion of the process fluid, wherein the substance is selected from the group consisting of clay stabilisers, friction modifiers, chain breakers, gelling agents, crosslinkers, and buffering agents.

Further preferred features of the preparation process according to the disclosure are disclosed in the documents of WO 00/053814 A1, WO 01/88205 A1, WO 2004/081236 A1 or WO 2008/067578 A1.

For the purposes of the disclosure, any fluid is understood to be the process fluid for use in the Earth's crust that is used in a process in the Earth's crust. Preferably, this is a large scale process which is reflected in the requirement to provide large quantities of process fluid (e.g. millions of liters) economically. The process fluid according to the disclosure may for example be a liquid, a gel or a liquid foam. Preferably, the process fluid is water. Preferably, the process fluid is a liquid or a gel.

Furthermore, it is preferable that the biostabiliser of the process fluid of the disclosure is dissolved in particular in water or the water containing portion of the process fluid—however, the biostabiliser may, partly or wholly, be provided in suspension or emulsion in the process fluid of the disclosure.

A biostabiliser is understood to be a substance which may slow down or inhibit the growth (in particular the proliferation) and/or the metabolism of microorganisms such as bacteria, archaea or fungal cells. In contrast, a biocide is understood to be a substance which kills microorganisms. In this regard, a biocide acts more aggressive than a biostabiliser. To those skilled in the art it is evident that a biostabiliser may also act as a biocide under special circumstances (e.g. at high doses in highly susceptible microorganisms etc.).

The biostabilising effect of a substance can be measured in many different ways, which are known in the art, among others by means of methods such as are disclosed in the documents cited herein. Preferred methods for determining the biostabilising effect are the microdilution test, spot test or well diffusion test. Also, the methods disclosed in White et al. or in Jorgensen and Ferraro are preferred.

For the measurement of the biostabilising effect, the substance is often added to a sample up to one or more particular concentrations (e.g. 0.1 ppm, 0.5 ppm, 1 ppm, 5 ppm, 10 ppm, 25 ppm, 50 ppm, 100 ppm, 200 ppm, 300 ppm, 400 ppm, 500 ppm, 1000 ppm, 5000 ppm, 10000 ppm), wherein the sample comprises the living undesirable microorganism and may, for example, be a pure culture, a mixed culture, a sample taken from the Earth's crust or a sample which is similar to a sample taken from the Earth's crust (e.g. sewage sludge). Then the biostabilising effect of the substance can be determined by comparing the sample with the substance after one or more certain time periods (e.g. 1 d, 2 d, 3 d, 4 d, 5 d, 10 d, 20 d, 30 d, 60 d, 90 d, 120 d) with itself at the initial time point and/or with a control (the sample without the substance, e.g. with water instead of the substance). This comparison may be a direct comparison, including: determining the number of bacteria by plating and determining the CFU/ml (colony forming units) or measuring the turbidity (e.g. determining the OD600). This comparison may as well be an indirect comparison, e.g. the measurement of an undesired effect which may be caused by the undesirable microorganism (e.g. sulphide production, acid production, production of extracellular polymeric substances). Particularly in the case of oil and natural gas extraction, the reduction in microbial sulphide production can be an important parameter to determine the suitability of the substance as a biostabiliser. A biostabiliser preferably has one or more of the described effects on selected undesirable microorganisms, such as those mentioned herein: Lower increase in biomass than in the control, lower sulphide production than in the control, lower acid production than in the control, lower production of extracellular polymeric substances than in the control, lower biofilm production than in the control.

According to Brock Biology of Microorganisms, page 138, the terms mesophilic, thermophilic, hyperthermophilic, halo-tolerant, and halophilic are to be understood as follows:

Mesophilic: refers to a microorganism which grows best between 20° C. and 45° C.; thermophilic: refers to a microorganism which grows best between 45° C. and 80° C.; hyperthermophilic: refers to a microorganism which grows best at 80° C. and higher; halo-tolerant: refers to a microorganism which can grow in high salt concentrations (e.g. a mass concentration of 25% NaCl); halophilic: refers to a microorganism which needs high salt concentrations (e.g. a mass concentration of 25% NaCl) for growth.

The present disclosure is further illustrated by the following figures and examples, to which it will of course not be limited.

BRIEF DESCRIPTION OF THE FIGURES

FIG. 1C is the growth curve at 1 ppm, FIG. 1D is the growth curve at 10 ppm, FIG. 1E is the growth curve at 50 ppm, FIG. 1F is the growth curve at 100 ppm, FIG. 1G is the growth curve at 250 ppm of biostabiliser I; and FIG. 1H is the growth curve at 0.5 ppm, FIG. 1I is the growth curve at 1 ppm, FIG. 1J is the growth curve at 10 ppm, FIG. 1K is the growth curve at 50 ppm, FIG. 1L is the growth curve at 100 ppm, FIG. 1M is the growth curve at 250 ppm of biostabiliser II. The dose-dependent tendency towards biostabilisation is clearly evident.

DETAILED DESCRIPTION

Examples

Example 1

Figure 1A:
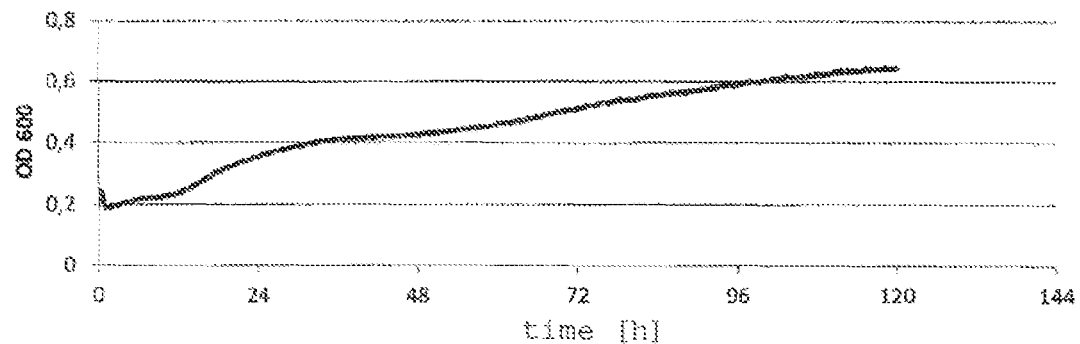
FIGS. 1A, 1B, 1C, 1D, 1E, 1F, 1G, 1H, 1I, 1J, 1K, 1L and 1M: Effect of the biostabilisers on *Halanaerobium congolense*. In accordance with example 4, the strain DSM 11287 was exposed to biostabiliser I (hop acid) or to biostabiliser II (resin acid/myristic acid) in various concentrations. Shown in FIG. 1A is the growth curve without biostabiliser; shown in FIG. 1B is the growth curve at 0.5 ppm.
Figure 1B:
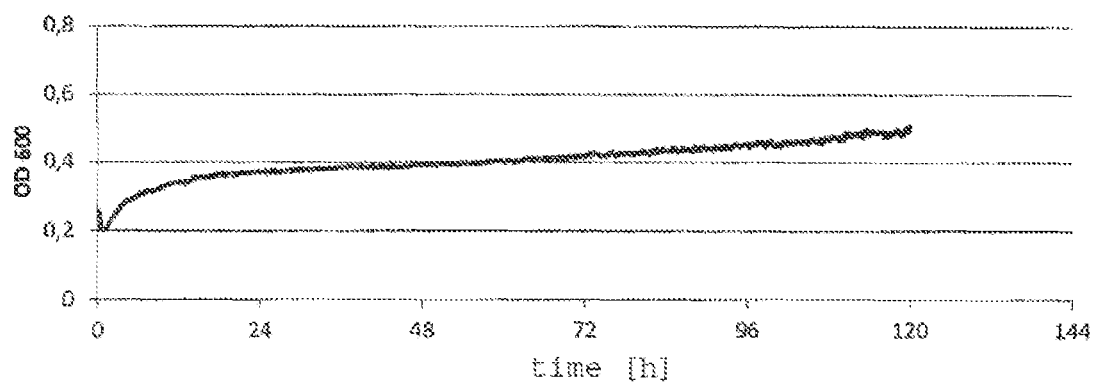
Figure 1C:
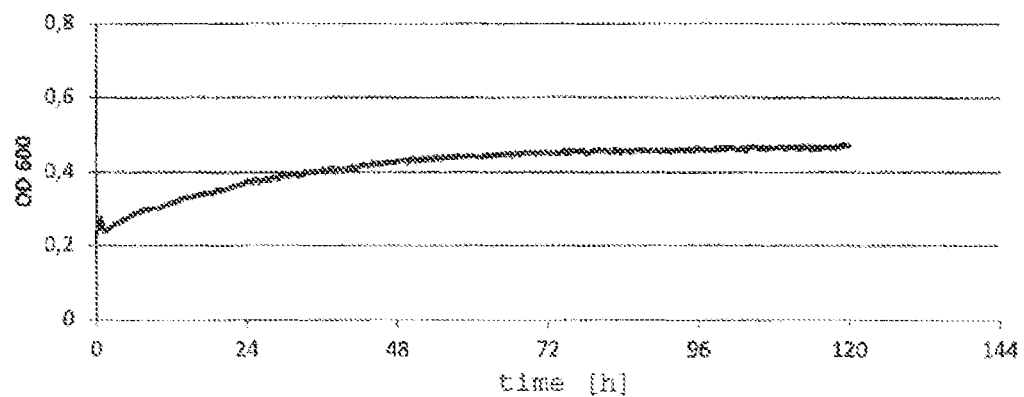
Figure 1D:
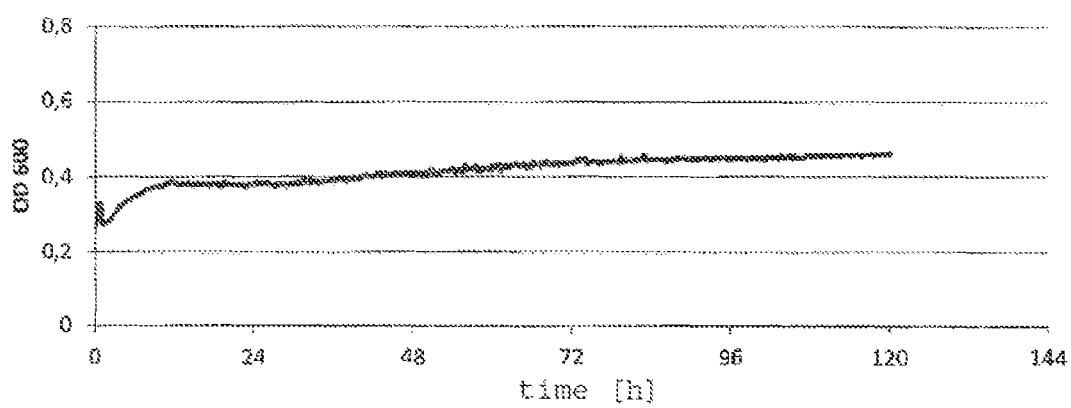
Figure 1E:
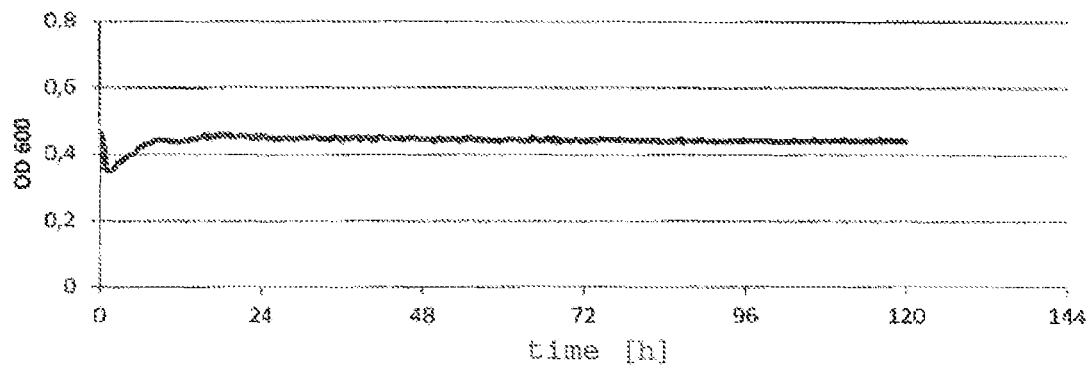
Figure 1F:
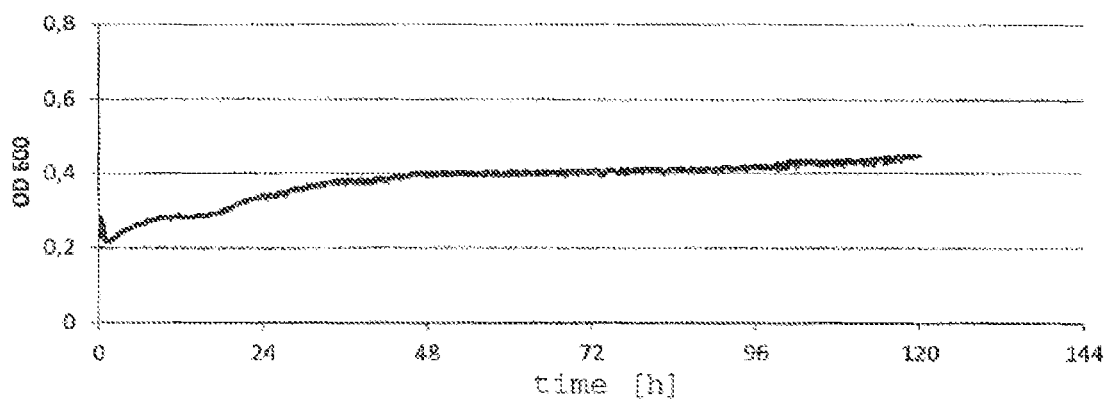
Figure 1G:
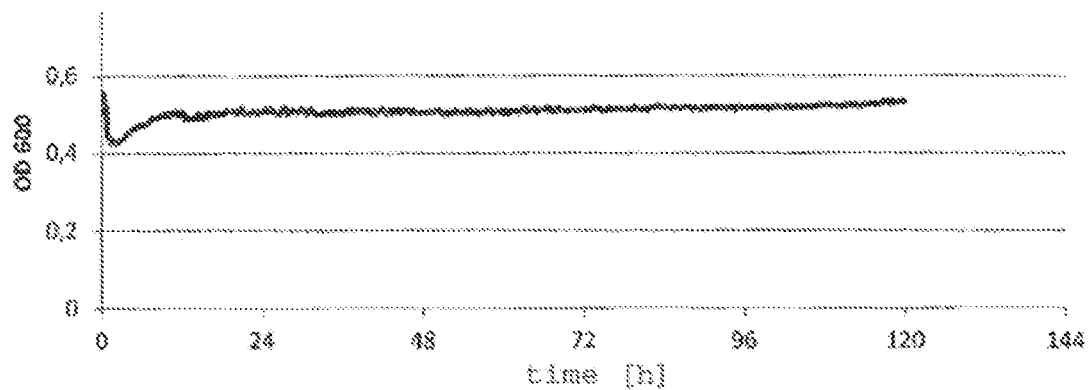
Figure 1H:
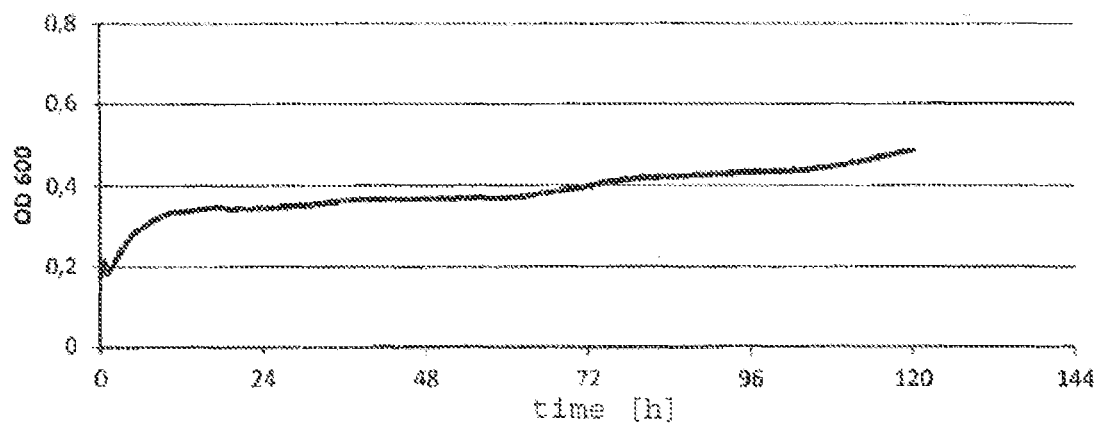
Figure 1I:
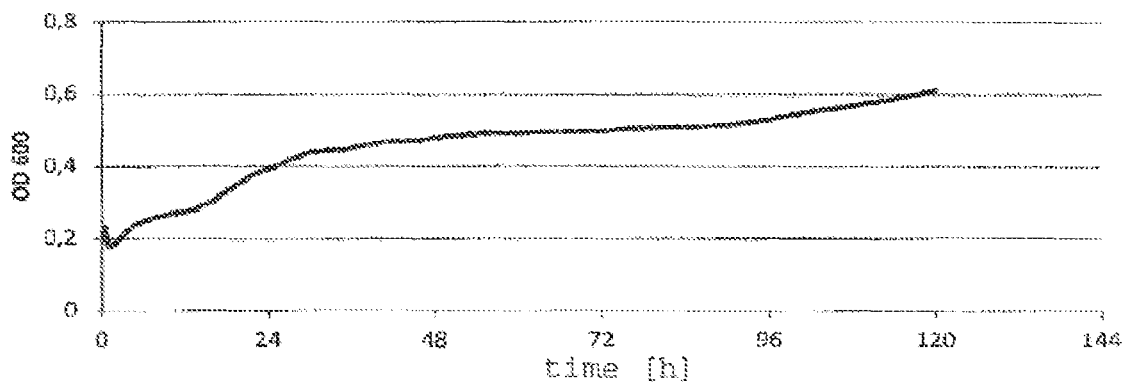
Figure 1J:
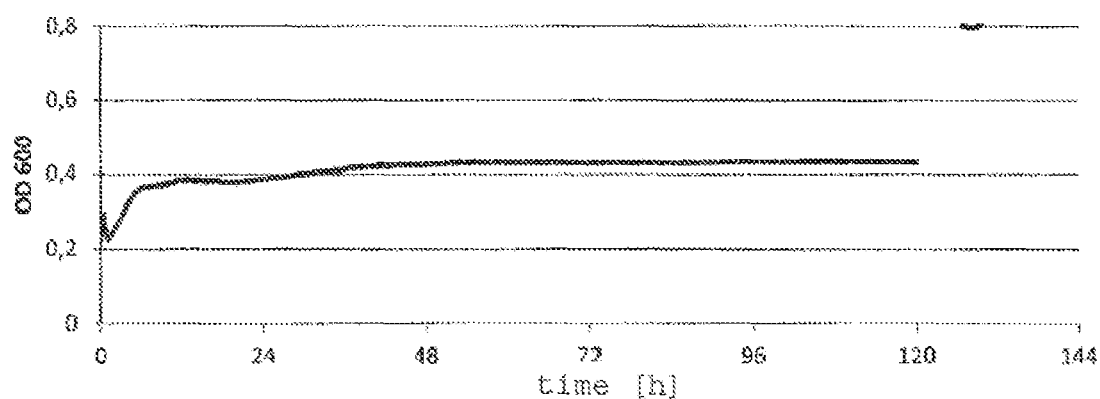
Figure 1K:
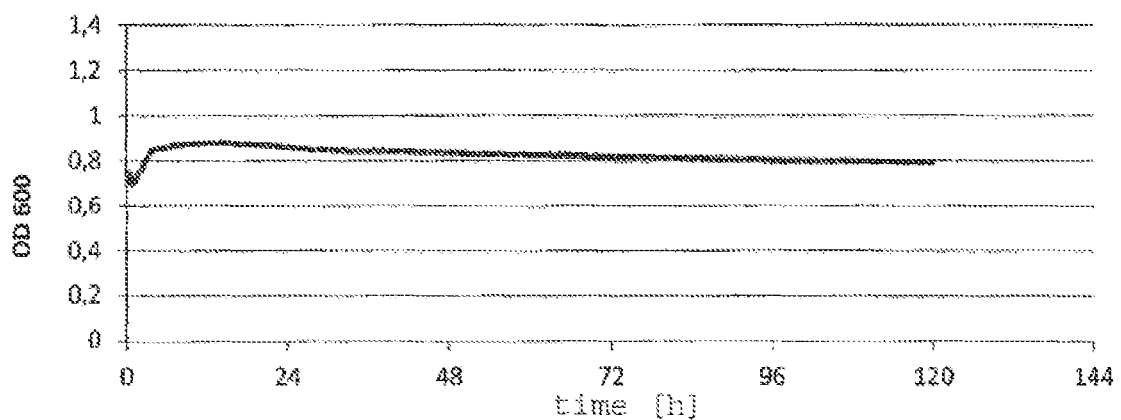
Figure 1L:
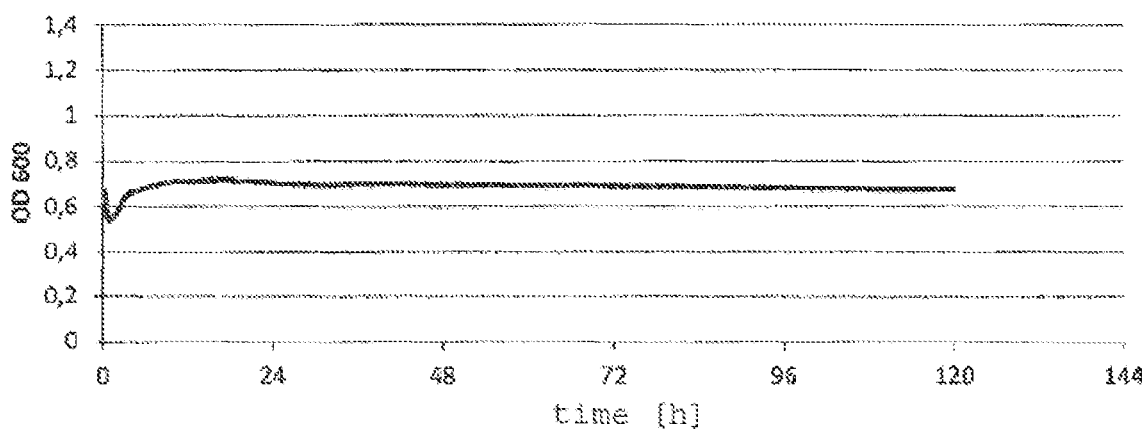
Figure 1M:
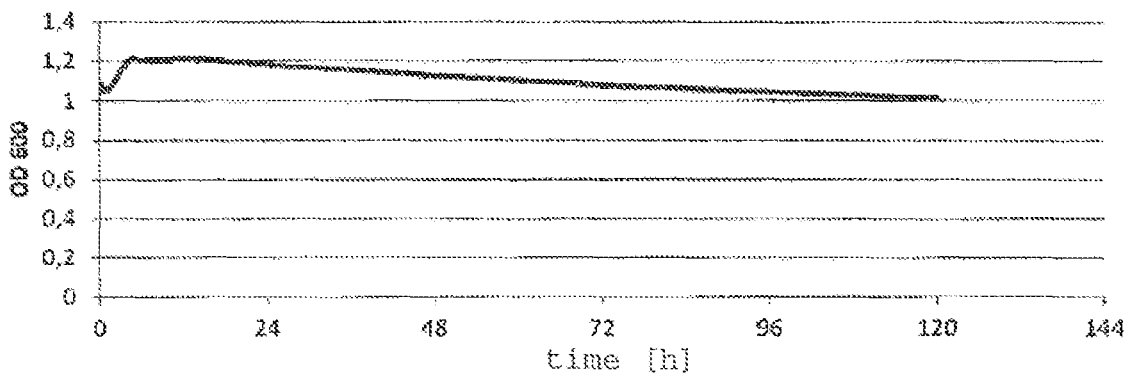
Figure 2A:
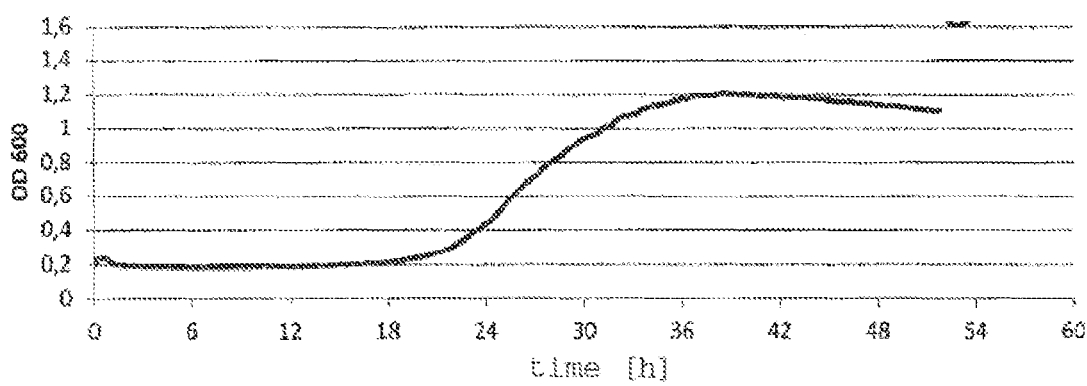
FIGS. 2A, 2B, 2C, 2D, 2E, 2F, 2G, 2H, 2I, 2J, 2K, 2L and 2M: Effect of the biostabilisers on *Halolactibacillus miurensis*. In accordance with example 4, the strain DSM 17074 was exposed to biostabiliser I (hop acid) or to biostabiliser II (resin acid/myristic acid) in various concentrations. Shown in FIG. 2A is the growth curve without biostabiliser; shown in FIG. 2B is the growth curve at 0.5 ppm, shown in FIG. 2C is the growth curve at 1 ppm, shown in FIG. 2D is the growth curve at 10 ppm, shown in FIG. 2F is the growth curve at 100 ppm, shown in FIG. 2G is the growth curve at 250 ppm of biostabiliser I; and shown in FIG. 2H is the growth curve at 0.5 ppm, shown in FIG. 2I is the growth curve at 1 ppm, shown in FIG. 2J is the growth curve at 10 ppm, shown in FIG. 2K is the growth curve at 50 ppm, shown in FIG. is the growth curve 2L is the growth curve at 100 ppm, shown in FIG. 2M is the growth curve at 250 ppm of biostabiliser II. The dose-dependent tendency towards biostabilisation is clearly evident.
Figure 2B:
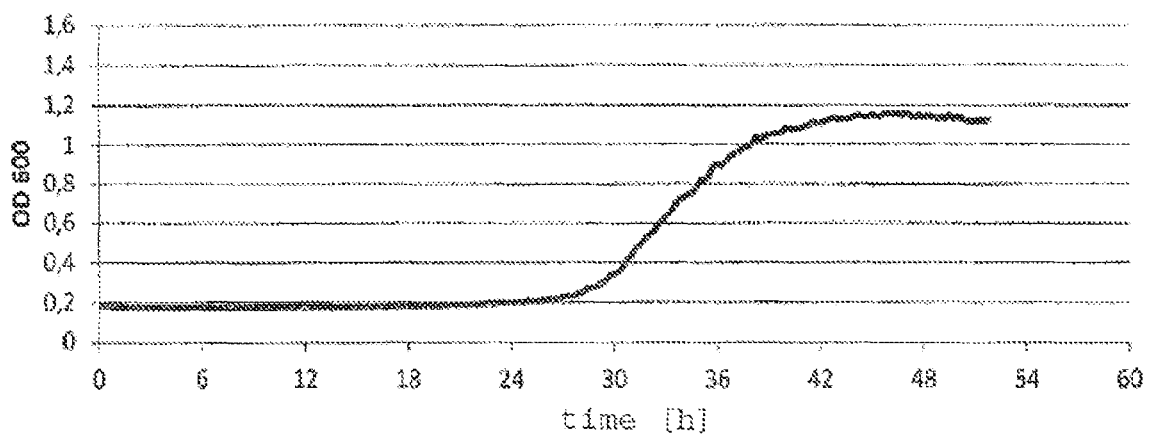
Figure 2C:
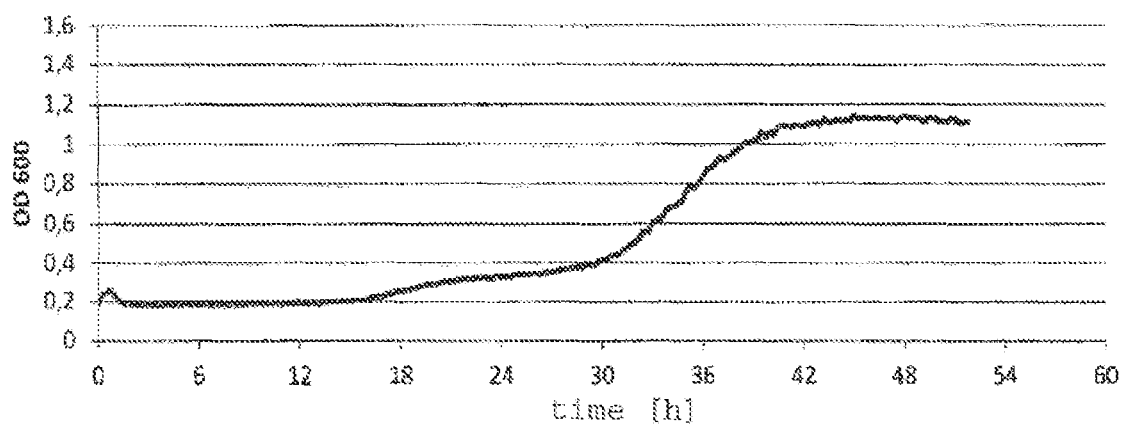
Figure 2D:
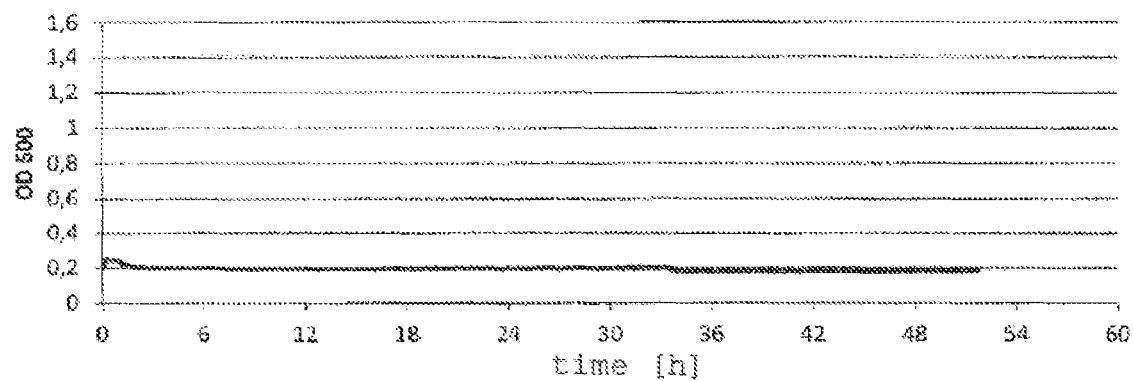
Figure 2E:
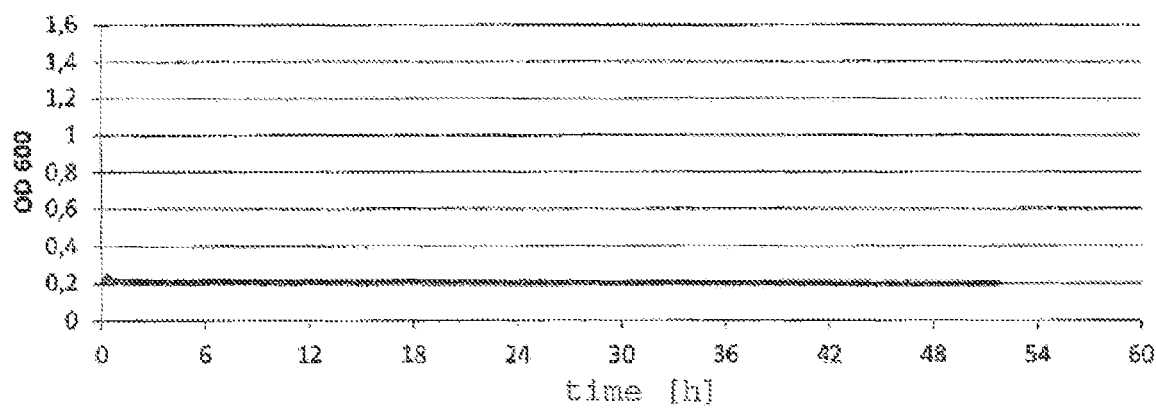
Figure 2F:
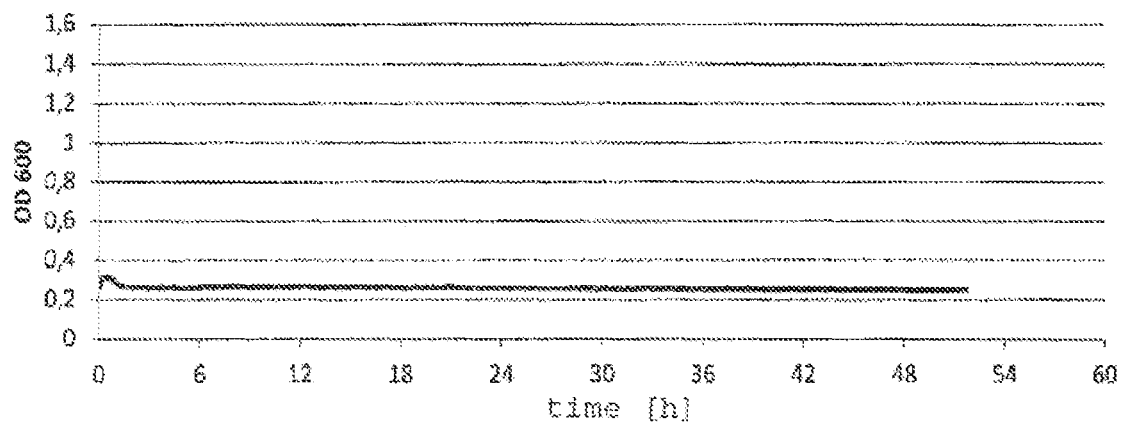
Figure 2G:
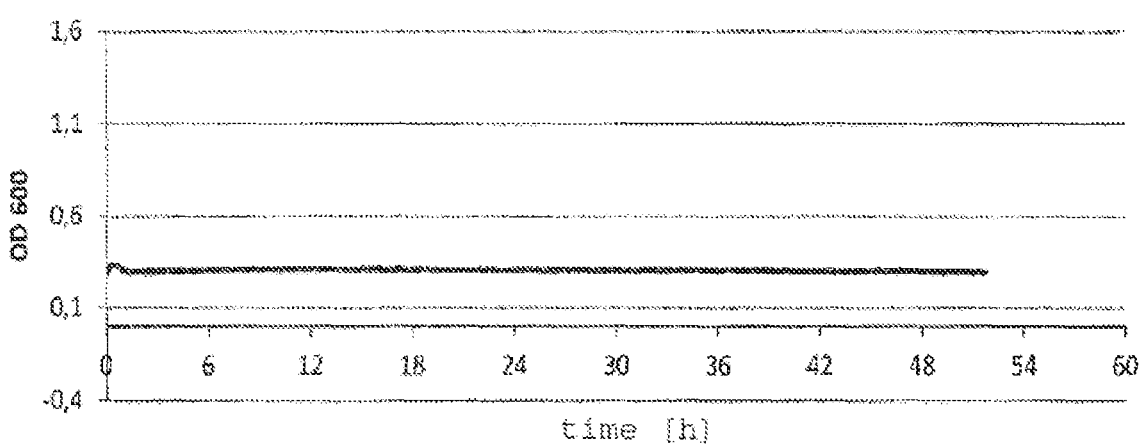
Figure 2H:
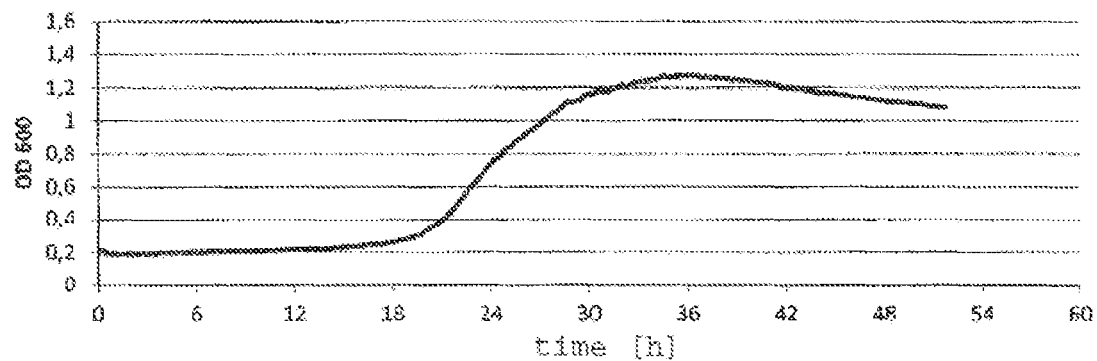
Figure 2I:
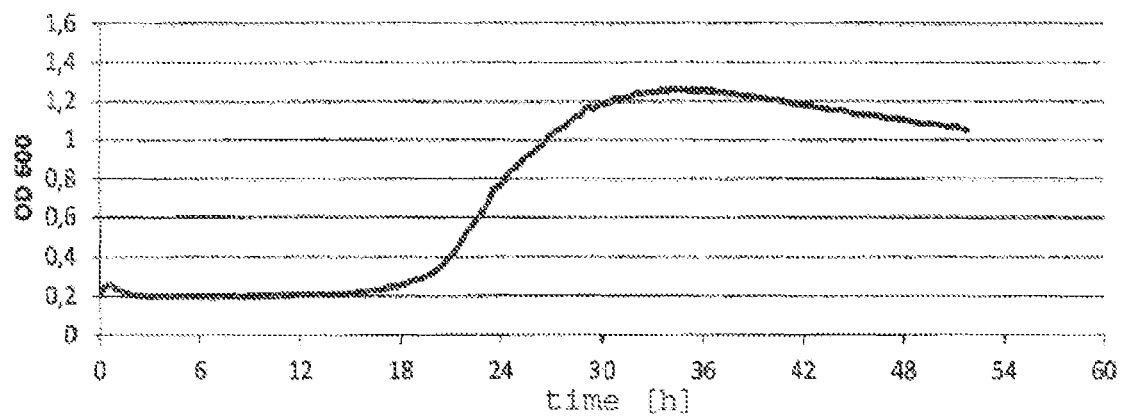
Figure 2J:
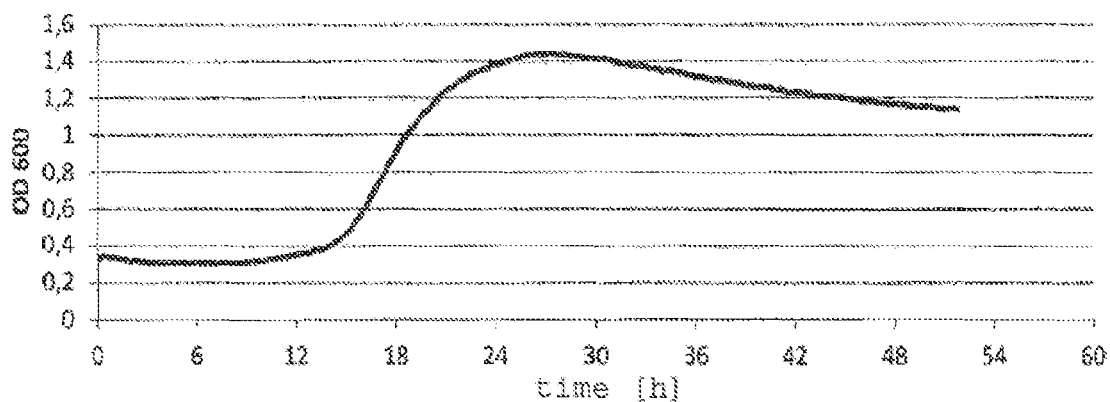
Figure 2K:
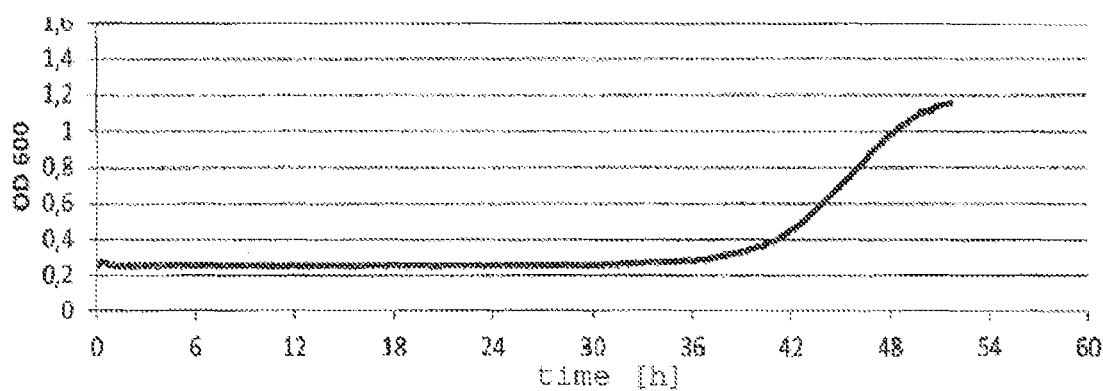
Figure 2L:
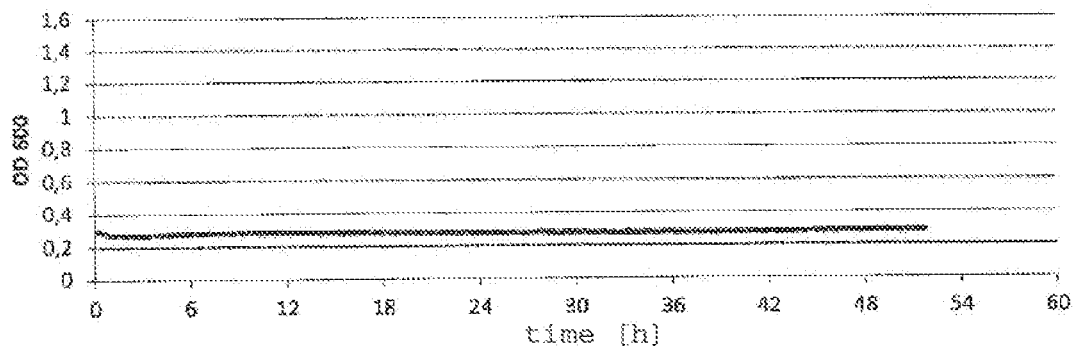
Figure 2M:
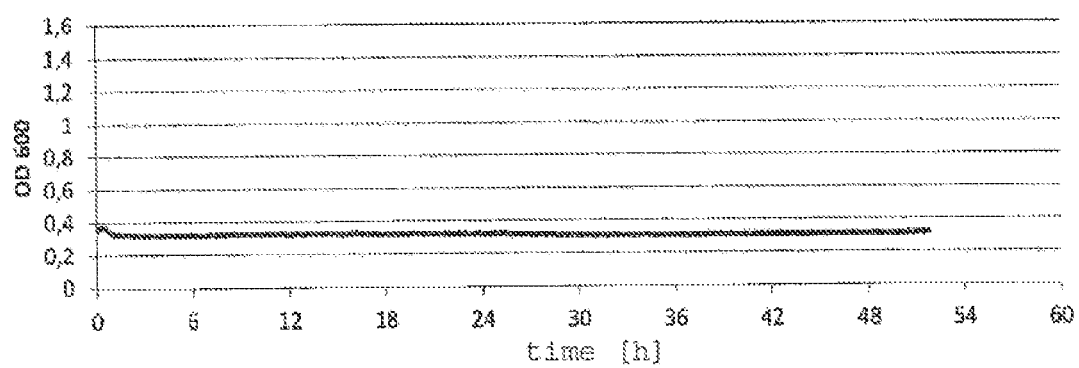
Figure 3A:
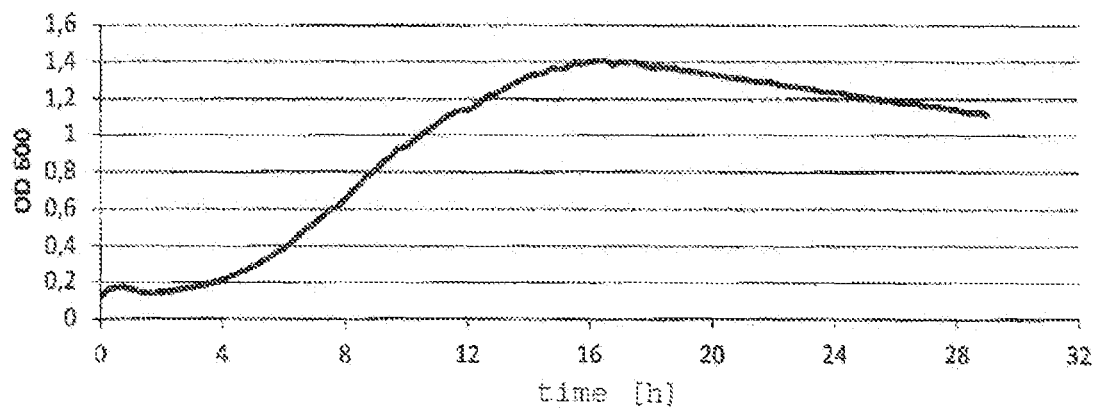
FIGS. 3A, 3B, 3C, 3D, 3E, 3F, 3G, 3H, 3I, 3J, 3K, 3L and 3M: Effect of the biostabilisers on *Halolactibacillus halophilus*. In accordance with example 4, the strain DSM 17073 was exposed to biostabiliser I (hop acid) or to biostabiliser II (resin acid/myristic acid) in various concentrations. Shown in FIG. 3A is the growth curve without biostabiliser; shown in FIG. 3B is the growth curve at 0.5 ppm, shown in FIG. 3C is the growth curve at 1 ppm, shown in FIG. 3D is the growth curve at 10 ppm, shown in FIG. 3E is the growth curve at 50 ppm, shown in FIG. 3F is the growth curve at 100 ppm, shown in FIG. 3G is the growth curve at 250 ppm of biostabiliser I; and shown in FIG. 3H is the growth curve at 0.5 ppm, shown in FIG. 3I is the growth curve at 1 ppm, shown in FIG. 3J at 10 ppm, shown in FIG. 3K is the growth curve at 50 ppm, shown in FIG. 3L is the growth curve at 100 ppm, shown in FIG. 3M is the growth curve at 250 ppm of biostabiliser II. The dose-dependent tendency towards biostabilisation is clearly evident.
Figure 3B:
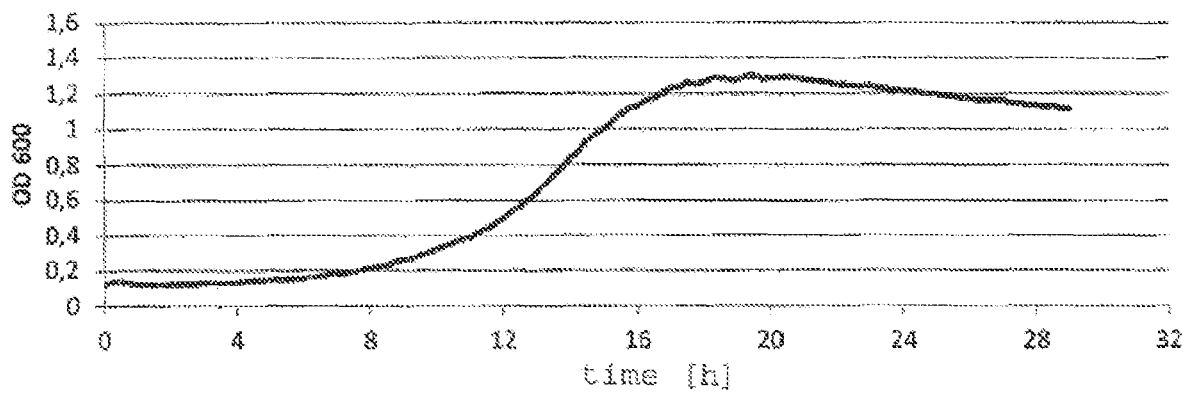
Figure 3C:
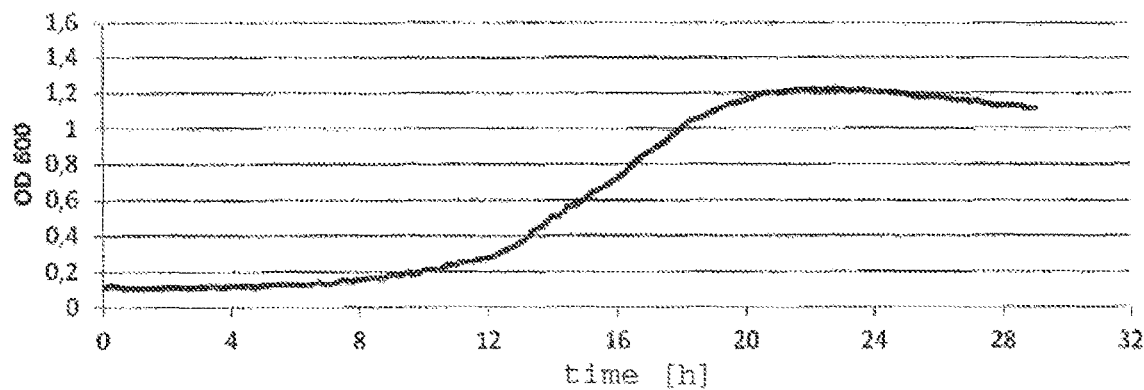
Figure 3D:
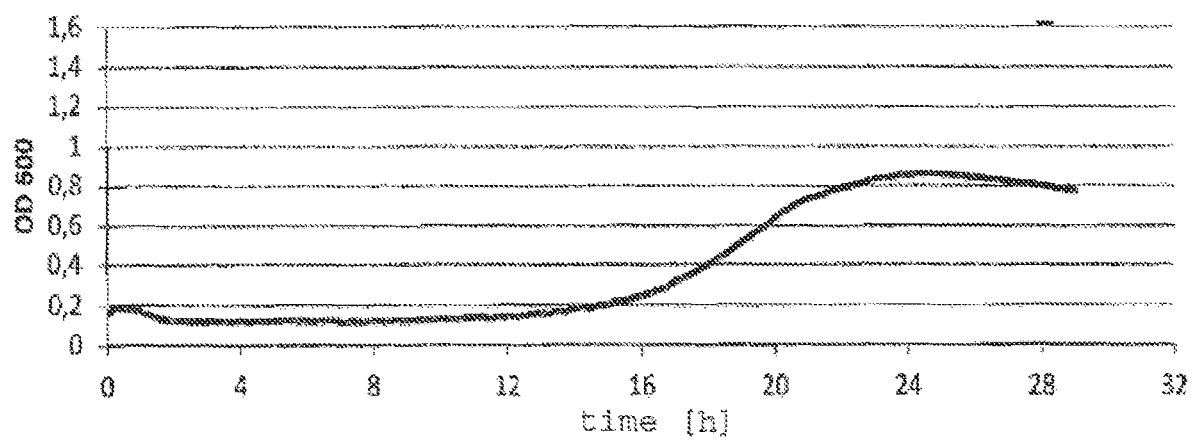
Figure 3E:
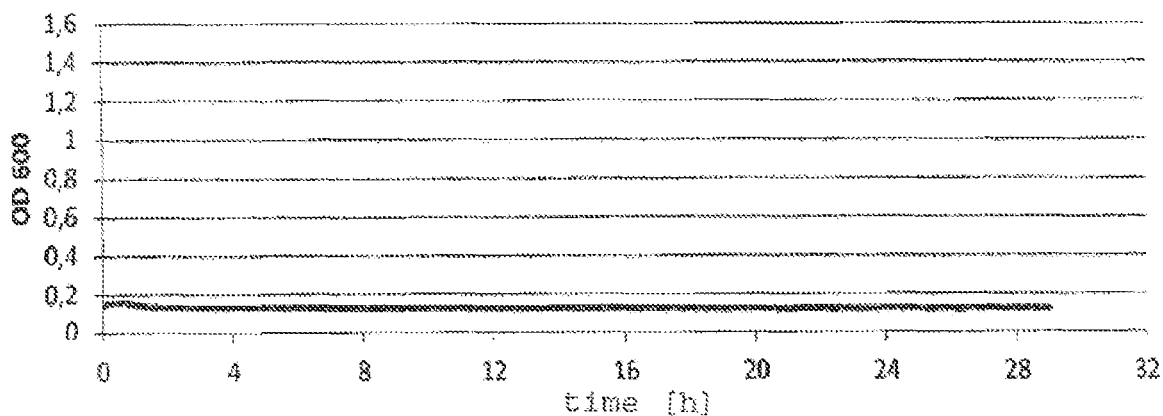
Figure 3F:
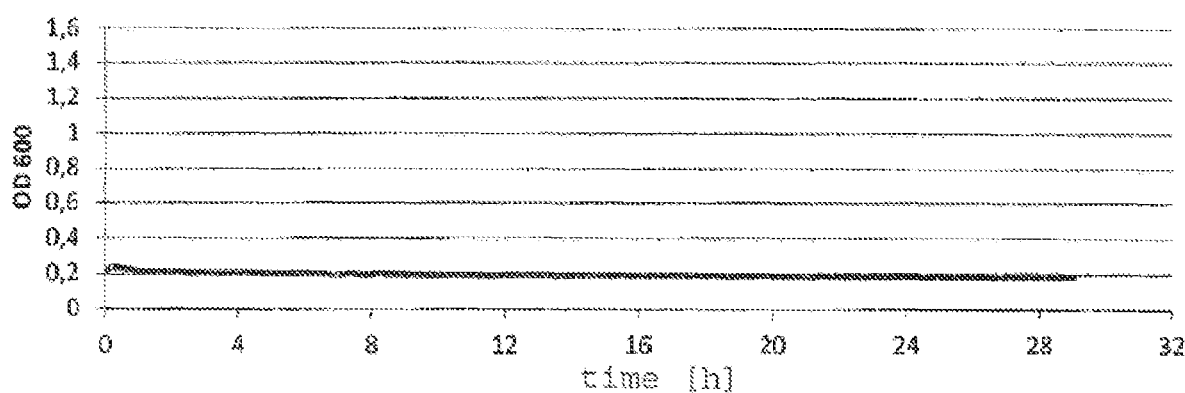
Figure 3G:
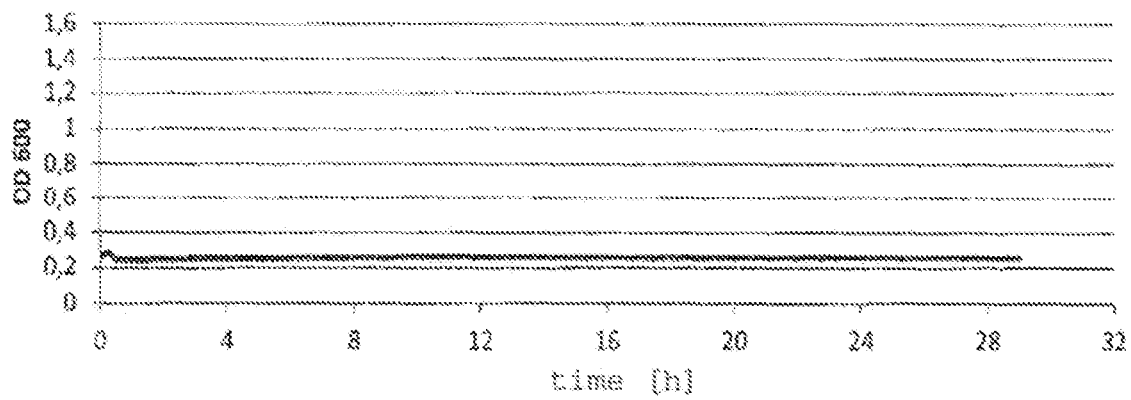
Figure 3H:
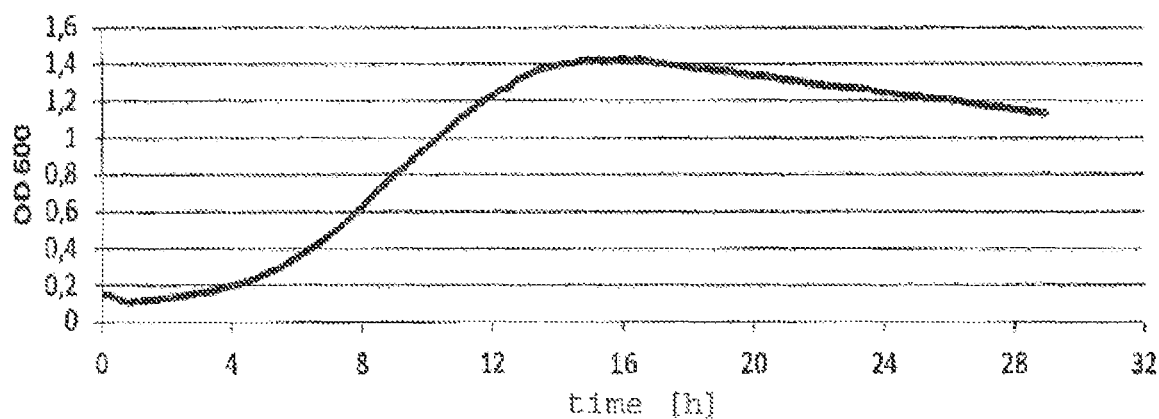
Figure 3I:
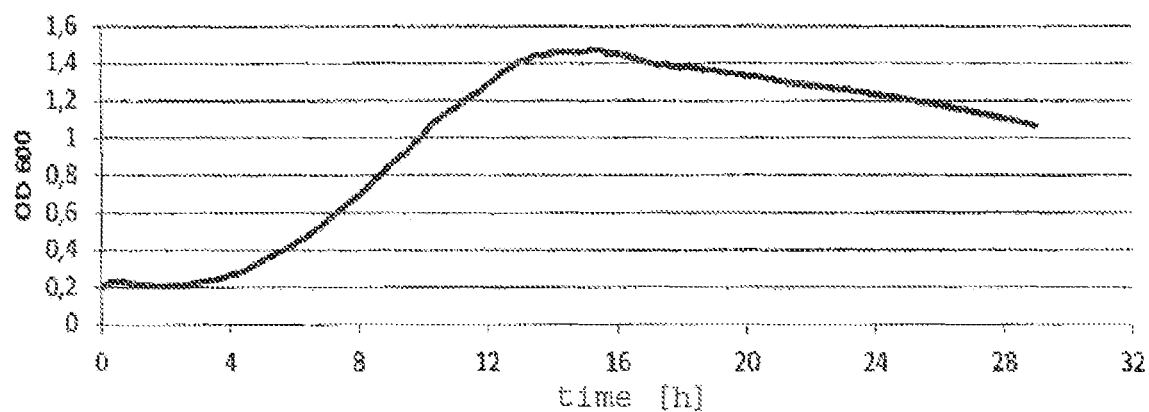
Figure 3J:
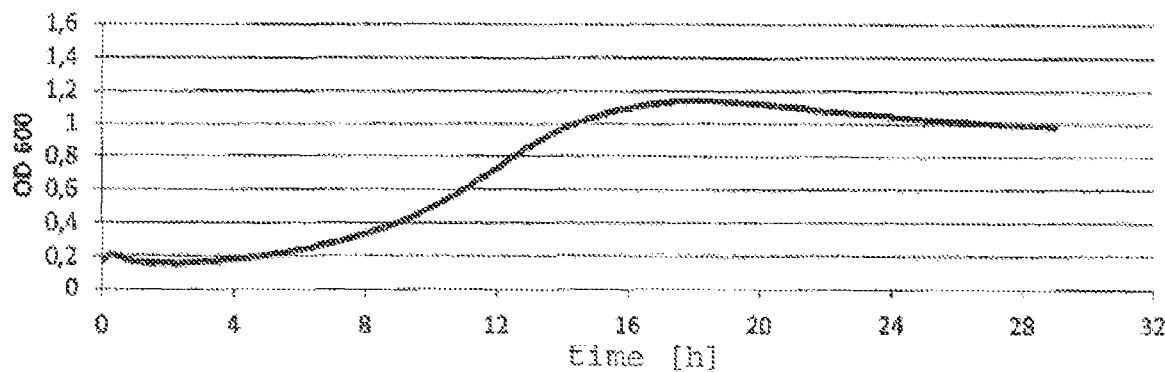
Figure 3K:
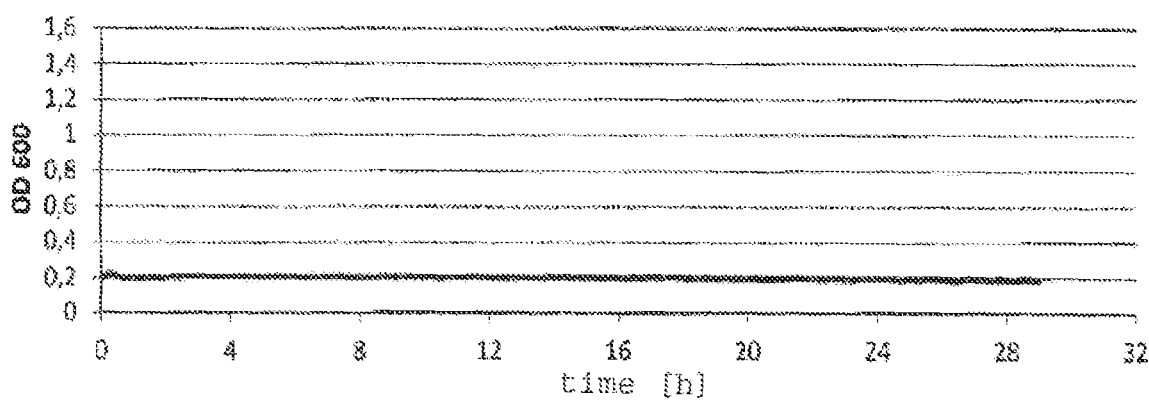
Figure 3L:
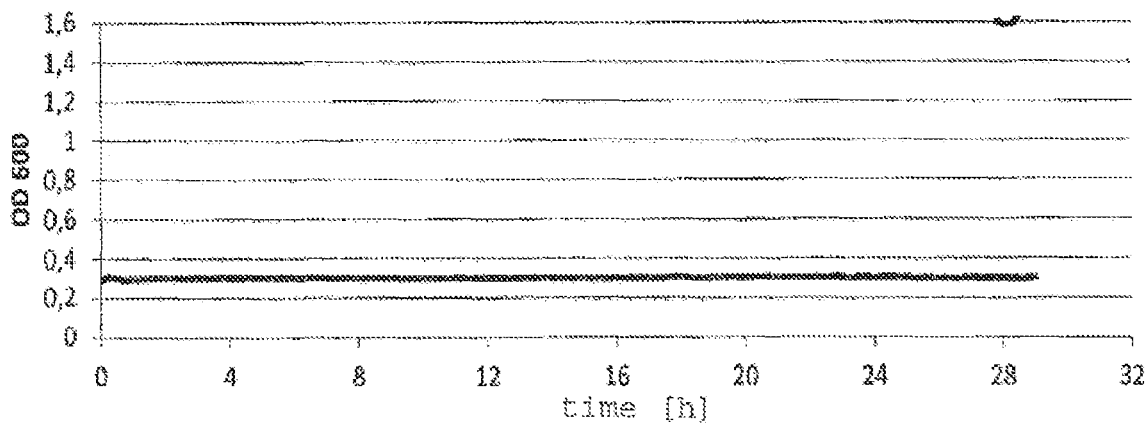
Figure 3M:
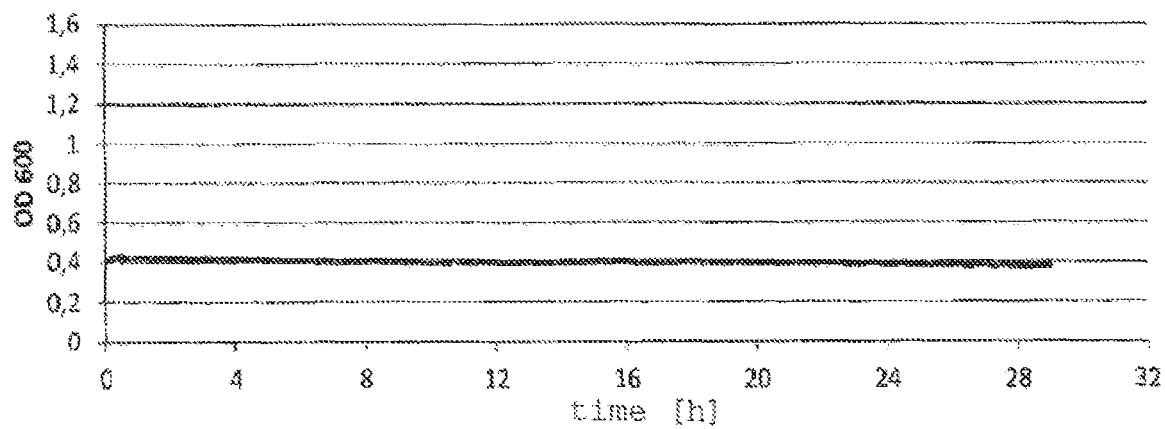

Preparation of the Process Fluid According to the Disclosure for Use in Hydraulic Fracturing For a bore, 560000 kg of inventive process fluid with biostabiliser (as fracfluid) are provided:

To 390000 liters of water the following substances are added: hop acid extract (28 kg of a 10% alkaline hop acid solution for a concentration of 5 mg/kg hop acids), rosin and myristic acid extract (140 kg of a 20% alkaline 50:50 solution of rosin and myristic acid for a concentration of 25 mg/kg resin acids and 25 mg/kg myristic acid) and 165000 kg of sintered bauxite as a proppant.

In addition, the following substances are added: 200 kg of sodium thiosulphate, 250 kg of sodium hydrogen carbonate, 300 kg of choline chloride, 75 kg of diammonium peroxodisulphate, 200 kg of sodium bromate, 100 kg of zirconyl chloride, 3900 kg of starch derivative.

Example 2

Biostabilising Effect on *Halanaerobium*

Preparation of the growth medium:

Trace element stock solution: Add 1.50 g of nitrilotriacetic acid to 1 L distilled water, adjust pH to 6.5 with KOH. Then add: $MgSO_4 \times 7\ H_2O$ 3 g, $MnSO_4 \times H_2O$ 0.50 g, NaCl 1 g, $FeSO_4 \times 7\ H_2O$ 0.10 g, $CoSO_4 \times 7\ H_2O$ 0.18 g, $CaCl_2 \times 2\ H_2O$ 0.10 g, $ZnSO_4 \times 7\ H_2O$ 0.18 g, $CuSO_4 \times 5\ H_2O$ 0.01 g, $KAl(SO_4)_2 \times 12\ H_2O$ 0.02 g, $H_3BO_3$ 0.01 g, $Na_2MoO_4 \times 2$ H$_2$O 0.01 g, NiCl$_2$×6 H$_2$O 0.03 g, Na$_2$SeO$_3$×5 H$_2$O 0.30 mg and Na$_2$WO$_4$×2 H$_2$O 0.40 mg, adjust pH to 7 with KOH.

Medium basis: Add NH$_4$Cl 1 g, K$_2$HPO$_4$ 0.3 g, KH$_2$PO$_4$ 0.3 g, MgCl$_2$×6 H$_2$O 10 g, CaCl$_2$×2 H$_2$O 0.1 g, KCl 1 g, sodium acetate 0.5 g, cysteine 0.5 g, trypticase 1 g, yeast extract 1 g, NaCl 100 g, trace element stock solution 1 ml and resazurin 0.001 g to 1 L of distilled water.

Boil the medium basis, cool down under N$_2$:CO$_2$ (80:20 v/v). Aliquot under N$_2$:CO$_2$ (80:20 v/v) in culture tubes and autoclave. Add to sterile medium basis the following sterile stock solutions up to the concentrations shown in parenthesis: 2% Na$_2$S×9 H$_2$O (0.2 ml/10 ml), 10% NaHCO$_3$ (0.2 ml/10 ml), 1 M glucose (0.2 ml/10 ml) and 1 M sodium thiosulphate (0.2 ml/10 ml). Optionally adjust pH to 7. Like this, the growth medium is obtained.

*Halanaerobium congolense* (DSM 11287) is obtained from the German Collection of Microorganisms and Cell Cultures (DSMZ). Grow a pre-culture at 42° C. under anaerobic conditions in the growth medium, thereby incubating for 7 days.

Provide 5 culture tubes (R0-R4), each with 2 ml of growth medium, wherein biostabiliser (in the form of hop extract, rosin in sodium salt solution and myristic acid in sodium salt solution) is added to the growth medium in each culture tube up to the following concentrations:

| Tube | Hop Acid [ppm] | Resin Acid [ppm] | Myristic Acid [ppm] |
|---|---|---|---|
| R0 | 0 | 0 | 0 |
| R1 | 5 | 25 | 25 |
| R2 | 20 | 100 | 100 |
| R3 | 100 | 500 | 500 |
| R4 | 200 | 1000 | 1000 |

Inoculate the tubes with 20 µl of pre-culture each and then determine, after 1, 2, 3 and 4 days of incubation at the growth conditions mentioned above, the optical density (OD). A lower optical density compared to R0 is found, wherein the density difference to R0 increases with higher biostabiliser concentration. In addition, the amount of respectively produced H$_2$S can be determined.

Example 3

Biostabilising Effect on *Halolactibacillus*

Preparation of the growth medium:

Add peptone 5 g, yeast extract 5 g, glucose 10 g, KH$_2$PO$_4$ 1 g, MgSO$_4$×7 H$_2$O 0.2 g, NaCl 40 g, Na$_2$CO$_3$ 10 g to 1 L of distilled water. Optionally adjust pH to 9.6.

*Halolactibacillus halophilus* (DSM 17073) is obtained from the German Collection of Microorganisms and Cell Cultures (DSMZ). Grow a pre-culture at 30° C. in the growth medium, thereby incubating for 3 days.

Provide 5 culture tubes (R0-R4), each with 2 ml of growth medium, wherein biostabiliser (in the form of hop extract, rosin in sodium salt solution and myristic acid in sodium salt solution) is added to the growth medium in each culture tube up to the following concentrations:

| Tube | Hop Acid [ppm] | Resin Acid [ppm] | Myristic Acid [ppm] |
|---|---|---|---|
| R0 | 0 | 0 | 0 |
| R1 | 5 | 25 | 25 |
| R2 | 20 | 100 | 100 |
| R3 | 100 | 500 | 500 |
| R4 | 200 | 1000 | 1000 |

Inoculate the tubes with 20 µl of pre-culture each and then determine, after 1, 2, 3 and 4 days of incubation at the growth conditions mentioned above, the optical density. A lower optical density compared to R0 is found, wherein the density difference to R0 increases with higher biostabiliser concentration.

Example 4

Biostabilising Effect on *Halanaerobium* and *Halolactibacillus*

The effect of selected biostabilisers (hop beta acids or resin acids/myristic acid, biostabiliser I or II) on the growth of three defined bacterial strains (*Halanaerobium congolense* DSM 11287, *Halolactibacillus halophilus* DSM 17073, *Halolactibacillus miurensis* DSM 17074) was analyzed by an in vitro experiment.

The following aqueous stock solutions for the selected biostabilisers were used: (I) 10% alkaline beta hop acid solution (hop extract) and (II) 20% alkaline solution of resin acids (rosin) and myristic acid (60:40).

TABLE 1

| | Culturing Conditions | |
|---|---|---|
| Strain | Culture medium | Environmental conditions |
| *Halanaerobium congolense* DSM 11287 | DSMZ Medium No. 933 (as in Example 2) | 3 days, anaerobic, 42° C. |
| *Halolactibacillus miurensis* DSM 17074 | DSMZ Medium No. 785 (as in Example 3) | 48 h, microaerophilic, 30° C. |
| *Halolactibacillus halophilus* DSM 17073 | DSMZ Medium No. 785 (as in Example 3) | 48 h, microaerophilic, 30° C. |

Each of the three test strains was grown for several days before the biostabilising experiments according to table 1. The species identity was checked by sequencing and again by a sequence comparison in public data bases.

The biostabilising experiments were carried out with the Bioscreen instrument. It involves a special microtiter plate photometer which simultaneously serves as an incubator and can accommodate up to two so-called Honeycomb microtiter plates with 100 wells simultaneously. The determination of the growth is carried out by an OD measurement at 600 nm. During the incubation the Honeycomb microtiter plates werde shaken every 15 sec before each measurement with medium strength for 5 sec. The OD measurement was carried out every 15 min.

In each of the tests carried out two Honeycomb microtiter plates per test strain were used which were each filled according to the same scheme. On the first microtiter plate, the biostabiliser I was tested and on the second plate, the biostabiliser II was tested at concentrations of 0.5 ppm, 1 ppm, 10 ppm, 50 ppm, 100 ppm, and 250 ppm. The concentration data in ppm in this example refer to the final concentration of hop acids in the growth medium (for I) and to the final concentration of resin acids/myristic acid in the growth medium (in the composition 60:40, for II). "ppm" in this example stands for mg of organic acids (i.e. hop acids or resin acids/myristic acid) per kg of solution (i.e. growth medium+additives).

All test strains were tested sevenfold (i.e. n=7) at each listed biostabiliser concentration. To this purpose, the respective biostabiliser concentrations were investigated in parallel with each bacterial strain in seven wells of the Honeycomb microtiter plate. In addition, three wells per biostabiliser concentration were included as control means, i.e. instead of the bacterial suspension, sterile water was pipetted into the wells. In addition, seven wells were carried out without biostabiliser on each plate for further control to detect the typical growth of each strain under the chosen test conditions. Sterility control included three additional wells each per biostabiliser and bacterial strain (medium without biostabiliser and without bacterial suspension).

In each well, the respective growth medium according to table 1, bacterial suspension (or sterile water at the appropriate controls) and the biostabiliser solution were pipetted at the appropriate concentration. To create a strictly anaerobic atmosphere for *Halanaerobium congolense*, the growth medium was mixed with oxyrase (oxygen removing enzyme). By mixing all of the components, the respectively desired biostabiliser concentrations were achieved. Subsequently, all wells were overlaid with 2-3 drops of sterile paraffin oil. This served to maintain the anaerobic conditions for *Halanaerobium congolense* and to create microaerophilic conditions for *Halolactibacillus miurensis* and *Halolactibacillus halophilus*.

Composition of each volume in the wells of the microtiter plate (for *Halanaerobium congolense*)
  300 µl 1.25×growth medium (DSMZ No. 933)
  50 µl bacterial suspension
  10 µl Oxyrase® (Oxyrase Inc., Ohio, USA)
  10 µl biostabiliser solution at an appropriate concentration
  2-3 drops of paraffin for overcoating Composition of each volume in the wells of the microtiter plate (for the other three strains)
  300 µl 1.25×growth medium (DSMZ No. 785 or CASO)
  50 µl bacterial suspension
  10 µl biostabiliser solution at an appropriate concentration
  2-3 drops of paraffin for overcoating The respective growth curves are shown in the figures and show a strong concentration-dependent influence on the growth of the test strains by the biostabilisers. At higher concentrations of the biostabilisers it comes to an opacification of the growth medium (i.e. higher initial OD value—for an assessment of the biostabilising effect, it is not the initial OD value which is relevant, but the course of the growth curve or the OD gain)—and occasionally to aberrations (because the biostabiliser occasionally precipitates out of solution), yet the dose-dependent tendency towards biostabilisation is clearly evident from the figures.

In most tested biostabiliser/test strain combinations, a concentration of 0.5 ppm is already causing an influence on the growth (lower OD gain or delayed reaching the maximum OD). A complete inhibition of growth (i.e. no OD enhancing growth occurs any more) appeared strain-individually mostly at 10 ppm or 50 ppm of biostabiliser concentration (see Table 2).

Under the test conditions, the biostabilisers I and II were able to inhibit the growth of the tested bacteria, i.e. to act biostabilising.

TABLE 2

Minimum biostabiliser concentration for total growth inhibition.

| Strain | Biostabiliser I [ppm] | Biostabiliser II [ppm] |
|---|---|---|
| *Halanaerobium congolense* DSM 11287 | 10 | 100 |
| *Halolactibacillus miurensis* DSM 17074 | 50 | 10 |
| *Halolactibacillus halophilus* DSM 17073 | 1 | 250 |

I: hop acids,
II: resin acids/myristic acid (60:40)

Example 5A

Preparation of the Process Fluid According to the Disclosure as a Drilling Fluid for Geothermal Drilling For a geothermal bore, 750000 L of process fluid with a biostabiliser were provided as a drilling fluid:

The following substances were added to 720000 L of water: hop acid extract as a biostabiliser (700 kg of a 10% alkaline hop acid solution for a hop acid concentration of 1 g/l). 61000 kg potassium carbonate to inhibit drilled solids; 18000 kg polyanionic cellulose (PAC) and 2250 kg xanthan.

In addition, the following substances were added: 4000 kg of citric acid, 1500 kg of soda, 3000 kg of bentonite and 720 L of defoamer on a fatty alcohol oxylate basis.

Example 5B

Inventive Use of the Process Fluid as a Drilling Fluid in Geothermal Drilling

When using a drilling fluid with the biostabiliser of Example 5A at a geothermal borehole in a drilling depth of 750-3200 m, microbiological contamination has been significantly reduced and the adverse effects such as odor, change in viscosity of the drilling fluid or degradation of xanthan can be prevented.

The microbiological tests were carried out on platecount agar by plating 100 µl of a drilling fluid sample and incubating for two days at 37° C. (the microbiological load is indicated in CFU=colony forming units per ml drilling fluid):

| | |
|---|---|
| Day 1 | Start of the second bore section (750 m depth). Drilling fluid of Example 5A, but without biostabiliser and defoamer, was used |
| Day 11 | Sampling from drilling fluid - bacterial growth overgrown agar, CFU therefore not well defined but surely far more than 3000. Among other things, a significant proportion of bacteria of the genera *Microbacterium* and *Dietzia* was present in the sample, as determined by sequencing. The drilling fluid of Example 5A with biostabiliser, but without defoamer, was now used. Unexpectedly it was shown that the use of a defoamer was advantageous so that after a short time the drilling fluid of Example 5A (i.e. with biostabiliser and defoamer) was used. |
| Day 18 | >300 CFU/ml |
| Day 21 | 93 CFU/ml |
| Day 29 | 13 CFU/ml |
| Day 37 | 14 CFU/ml |
| Day 43 | 19 CFU/ml |

| | |
|---|---|
| Day 50 | 18 CFU/ml |
| Day 61 | End of the drilling |

Thus, it has surprisingly been found that the process fluid with the biostabiliser according to the disclosure is also effective as a drilling fluid in a geothermal drilling, particularly against bacteria of the genera *Microbacterium* and *Dietzia*.

Cited non-patent-literature:

Ashraf et al. "Green biocides, a promising technology: current and future applications to industry and industrial processes." Journal of the Science of Food and Agriculture 94.3 (2014): 388-403

Cluff, Maryam A., et al. "Temporal Changes in Microbial Ecology and Geochemistry in Produced Water from Hydraulically Fractured Marcellus Shale Gas Wells." Environmental science & technology (2014)

Emerstorfer, Kneifel and Hein, "The role of plant-based antimicrobials in food and feed production with special regard to silage fermentation", Die Bodenkultur—Journal for Land Management, Food and Environment (2009), vol. 60, issue 3

Jorgensen and Ferraro, "Antimicrobial susceptibility testing: general principles and contemporary practices", Clinical Infectious Diseases 26, 973-980 (1998).

White, et al. "Antimicrobial resistance: standardisation and harmonisation of laboratory methodologies for the detection and quantification of antimicrobial resistance" Rev. sci. tech. Off. int. Epiz. 20 (3), 849-858 (2001).

Madigan et al. "Brock Biology of Microorganisms", 10. Ausgabe (2003), insbesondere S. 138

Mohan, Arvind, et al. "Microbial community changes in hydraulic fracturing fluids and produced water from shale gas extraction." Environmental science & technology 47.22 (2013): 13141-13150.

Mohan, Arvind, et al. "The Functional Potential of Microbial Communities in Hydraulic Fracturing Source Water and Produced Water from Natural Gas Extraction Characterized by Metagenomic Sequencing." PloS one 9.10 (2014): e107682.

Ravot, Gilles, et al. "*Haloanaerobium congolense* sp. nov., an anaerobic, moderately halophilic, thiosulfate and sulfur reducing bacterium from an African oil field." FEMS microbiology letters 147.1 (1997): 81-88.

[Struchtemeyer 2012] Struchtemeyer, Christopher G., Michael D. Morrison, and Mostafa S. Elshahed. "A critical assessment of the efficacy of biocides used during the hydraulic fracturing process in shale natural gas wells." International Biodeterioration & Biodegradation 71 (2012): 15-21.

[Struchtemeyer 2012b] Struchtemeyer, Christopher G., and Mostafa S. Elshahed. "Bacterial communities associated with hydraulic fracturing fluids in thermogenic natural gas wells in North Central Texas, USA." FEMS microbiology ecology 81.1 (2012): 13-25.

Ullmann's Encyclopedia of Industrial Chemistry, Vol. A 23 (1993), S. 73-88.

Wang, Jifu, et al. "Robust antimicrobial compounds and polymers derived from natural resin acids." Chemical Communications 48.6 (2012): 916-918.

The invention claimed is:

1. A method for hydraulic fracturing in a borehole in a geological formation comprising fuel-containing sediment, the method comprising the following steps:

injecting an aqueous fracturing fluid comprising a proppant and a biostabilizer into the borehole, thereby causing cracks in the fuel-containing sediment;

pumping up produced water from the borehole, the produced water comprising at least a part of the aqueous fracturing fluid mixed with formation water and fuel from the fuel-containing sediment; and during the pumping up, contacting at least one undesirable microorganism in the produced water with the biostabilizer, thereby inhibiting growth and/or metabolism of the at least one undesirable microorganism;

wherein the biostabilizer comprises at least one organic acid, or a salt, alcohol or aldehyde thereof, wherein the at least one organic acid is selected from a group consisting of hop acids, resin acids, fatty acids and mixtures thereof, and wherein the produced water is at most 20° dH (German Hardness).

2. The method according to claim 1, wherein the at least one undesirable microorganism is contacted with the biostabilizer at a depth of 1 km to 5 km.

3. The method according to claim 1, wherein the at least one undesirable microorganism is contacted with the biostabilizer at a temperature of 25° C. to 90° C.

4. The method according to claim 1, wherein the at least one undesirable microorganism is a bacterium selected from *Halolactibacillus* and *Halanaerobium*.

5. The method according to claim 1, wherein at least $10^4$ L of the aqueous fracturing fluid are injected into the borehole.

6. The method according to claim 1, wherein the aqueous fracturing fluid further includes at least one gelling agent, wherein the gelling agent is a biopolymer.

7. The method according to claim 6, wherein the biopolymer is a polysaccharide, wherein the polysaccharide is a starch.

8. The method according to claim 1, wherein the aqueous fracturing fluid further comprises at least one substance which is selected from a group consisting of gelling agents, clay stabilizers, friction modifiers, chain breakers, crosslinkers, buffering agents, and water softeners.

9. The method according to claim 1, wherein the biostabilizer comprises a mixture, the mixture consisting of:

at least one hop acid, or a salt, alcohol or aldehyde thereof; and at least one fatty acid, or a salt, alcohol or aldehyde thereof; or at least one resin acid, or a salt, alcohol or aldehyde thereof; and at least one fatty acid, or a salt, alcohol or aldehyde thereof; or at least one hop acid, or a salt, alcohol or aldehyde thereof; and at least one resin acid, or a salt, alcohol or aldehyde thereof.

10. The method according to claim 1, wherein the biostabilizer comprises at least one of the following components:

hop extract, a natural resin, the natural resin is added in dissolved form, and myristic acid or a salt thereof.

11. The method according to claim 1, wherein the at least one organic acid is a hop acid, wherein the hop acid is an alpha hop acid, selected from a group consisting of humulone, isohumulone, cohumulone, adhumulone, prehumulone, posthumulone, tetrahydroisohumulone, and tetrahydrodeoxyhumulone.

12. The method according to claim 1, wherein:

a total concentration of hop acids in the fracturing fluid is 0.01-1000 ppm; and/or a total concentration of resin acids in the fracturing fluid is 0.05-5000 ppm; and/or a total concentration of fatty acids in the fracturing fluid is 0.05-5000 ppm.

* * * * *